United States Patent
Shan et al.

(10) Patent No.: US 10,986,539 B2
(45) Date of Patent: *Apr. 20, 2021

(54) SOLUTION FOR VEHICLE-TO-EVERYTHING (V2X) COMMUNICATION AUTHORIZATION IN 5G SYSTEM

(71) Applicant: Intel IP Corporation, Santa Clara, CA (US)

(72) Inventors: Changhong Shan, Portland, OR (US); Meghashree Dattatri Kedalagudde, Hillsboro, OR (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/787,360

(22) Filed: Feb. 11, 2020

(65) Prior Publication Data

US 2020/0178123 A1    Jun. 4, 2020

Related U.S. Application Data

(63) Continuation of application No. 16/140,081, filed on Sep. 24, 2018, now Pat. No. 10,694,427.

(Continued)

(51) Int. Cl.
*H04W 4/46* (2018.01)
*H04W 28/22* (2009.01)
(Continued)

(52) U.S. Cl.
CPC .......... *H04W 28/22* (2013.01); *H04W 4/44* (2018.02); *H04W 4/46* (2018.02); *H04W 4/48* (2018.02);

(Continued)

(58) Field of Classification Search
CPC .............. H04W 4/46; H04W 72/0493; H04L 41/0893; H04L 1/0042; H04L 65/60
See application file for complete search history.

(56) References Cited

U.S. PATENT DOCUMENTS 10,694,427 B2 * 6/2020 Shan .................... H04W 12/08
2017/0288886 A1 10/2017 Atarius et al.
(Continued)

OTHER PUBLICATIONS

"3rd Generation Partnership Project; Technical Specification Group Services and System Aspects; Architecture enhancements for V2X services (Release 14)", 3GPP Standard; Technical Specification; 3GPP TS 23.285, 3rd Generation Partnership Project (3GPP), Mobile Competence Centre; 650 Route Des Lucioles; F-06921 Sophia-Antipolis Cedex; France vol SA WG2 No. V14.4.0, (Sep. 18, 2017), 1-35.

(Continued)

*Primary Examiner* — Salvador E Rivas
(74) *Attorney, Agent, or Firm* — Schwegman Lundberg & Woessner, P.A.

(57) ABSTRACT

Embodiments of Vehicle-to-everything (V2X) communications authentication are described. In some embodiments, a user equipment (UE) configured V2X communication and configured to operate within a fifth-generation system (5GS) and/or a combined 5GS and fourth-generation system (4GS) can encode a V2X capability indication in a request message for transmission to a network entity, such as a Access and Mobility Management Function (AMF). The V2X capability indication can indicate a capability of the UE for V2X communication over a PC5 reference point, and the request message can further include an indication of a Radio Access Technology (RAT). In some embodiments, the AMF can determine whether the UE is authorized to use the V2X communications over the PC5 reference point, and whether the UE is authorized to use the RAT indicated in the request (Continued)

message. Accordingly, the AMF can transmit a V2X services authorization to a next generation radio access network (NG-RAN).

20 Claims, 20 Drawing Sheets

Related U.S. Application Data

(60) Provisional application No. 62/564,090, filed on Sep. 27, 2017.

(51) Int. Cl.
*H04W 12/08* (2021.01)
*H04W 36/00* (2009.01)
*H04W 28/02* (2009.01)
*H04W 60/04* (2009.01)
*H04W 4/44* (2018.01)
*H04W 4/48* (2018.01)
*H04W 4/40* (2018.01)
*H04W 8/24* (2009.01)
*H04L 29/12* (2006.01)
*H04L 1/00* (2006.01)
*H04L 29/06* (2006.01)

(52) U.S. Cl.
CPC ....... *H04W 12/08* (2013.01); *H04W 28/0257* (2013.01); *H04W 36/0016* (2013.01); *H04W 60/04* (2013.01); *H04L 1/0042* (2013.01); *H04L 61/6027* (2013.01); *H04L 65/60* (2013.01); *H04W 4/40* (2018.02); *H04W 8/24* (2013.01)

(56) References Cited

U.S. PATENT DOCUMENTS

| 2018/0376304 | A1* | 12/2018 | Cheng | H04W 4/44 |
| 2019/0037448 | A1  | 1/2019  | Shan et al. | |
| 2019/0045526 | A1* | 2/2019  | Lee | H04L 5/00 |
| 2019/0141764 | A1* | 5/2019  | Fu | H04W 28/0257 |
| 2019/0335532 | A1* | 10/2019 | Kim | H04W 4/90 |

OTHER PUBLICATIONS

"U.S. Appl. No. 16/140,081, Non Final Office Action dated Dec. 26, 2019", 34 pgs.
"U.S. Appl. No. 16/140,081, Response filed Jan. 27, 2020 to Non Final Office Action dated Dec. 26, 2019", 11 pgs.
Brown, Gabriel, "Designing 5G-ready Mobile Core Networks", (Sep. 2016), 1-14.
U.S. Appl. No. 16/140,081, filed Sep. 24, 2018, Solution for Vehicle-to-Everything (V2X) Communication Authorization in 5G System.
"U.S. Appl. No. 16/140,081, Notice of Allowance dated Feb. 14, 2020", 15 pgs.
"Architecture enhancements for V2X services", 3GPP TS 23.285, version 14.3.0, Release 14, (Jul. 2017), 1-38.
"U.S. Appl. No. 16/140,081, Corrected Notice of Allowability dated Apr. 16, 2020", 2 pgs.

* cited by examiner

FIG. 5

AMF 132
| NAS | 506 |
|---|---|
| NG-AP | 515 |
| SCTP | 514 |
| IP | 513 |
| L2 | 512 |
| L1 | 511 |

RAN NODE 128/130
| RRC | 505 | NG-AP | 515 |
|---|---|---|---|
| PDCP | 504 | SCTP | 514 |
| RLC | 503 | IP | 513 |
| MAC | 502 | L2 | 512 |
| PHY | 501 | L1 | 511 |

UE 101/102
| APPLICATION LAYER | 522 |
|---|---|
| IMS CLIENT | 526 |
| CONN. MGR | 520 |
| OS LAYER | 524 |
| NAS | 506 |
| RRC | 505 |
| PDCP | 504 |
| RLC | 503 |
| MAC | 502 |
| PHY | 501 |

500

SOLUTION FOR VEHICLE-TO-EVERYTHING (V2X) COMMUNICATION AUTHORIZATION IN 5G SYSTEM

PRIORITY CLAIM

This application is a continuation of U.S. patent application Ser. No. 16/140,081, filed Sep. 24, 2018, which claims priority to U.S. Provisional Patent Application Ser. No. 62/564,090, filed Sep. 27, 2017 each of which is incorporated herein by reference in its entirety.

TECHNICAL FIELD

Embodiments pertain to wireless communications. Some embodiments relate to wireless networks including 3GPP (Third Generation Partnership Project) networks, 3GPP LTE (Long Term Evolution) networks, 3GPP LTE-A (LTE Advanced) networks, and fifth-generation (5G) networks including 5G new radio (NR) networks, next-generation (NG) networks, and 5G-LTE networks. Other embodiments are directed to solutions for vehicle-to-everything (V2X) communications, including authorization of V2X devices to use V2X communications over certain air interfaces in such 5G networks.

BACKGROUND

With the growth of the Internet of Things (IoT), the number of connected devices accessing network resources is set to increase, in particular for 5G networks. For example, connected vehicles are becoming an important part of the connected life of consumers. With the growth of autonomous driving and IoT on the horizon, V2X connectivity in vehicles, among vehicles, and between vehicles and infrastructure, as well as sensors and "things" surrounding the cars, becomes more desirable. An important aspect of V2X communications is the establishment of authorization procedures for such V2X devices.

BRIEF DESCRIPTION OF THE DRAWINGS

FIG. 5 is an illustration of a control plane protocol stack in accordance with some embodiments;

DESCRIPTION OF EMBODIMENTS

The following description and the drawings sufficiently illustrate embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

With the growth of autonomous driving and IoT on the horizon, V2X connectivity is becoming increasingly more desirable. Authorization for V2X communications is an important concern for vehicles with V2X connectivity, vehicle-to-vehicle communications, and vehicle-to-infrastructure communications. For example, it is important to have efficient V2X authentication methods within 5G and 5G/4G combined network architectures.

Figure 1A:
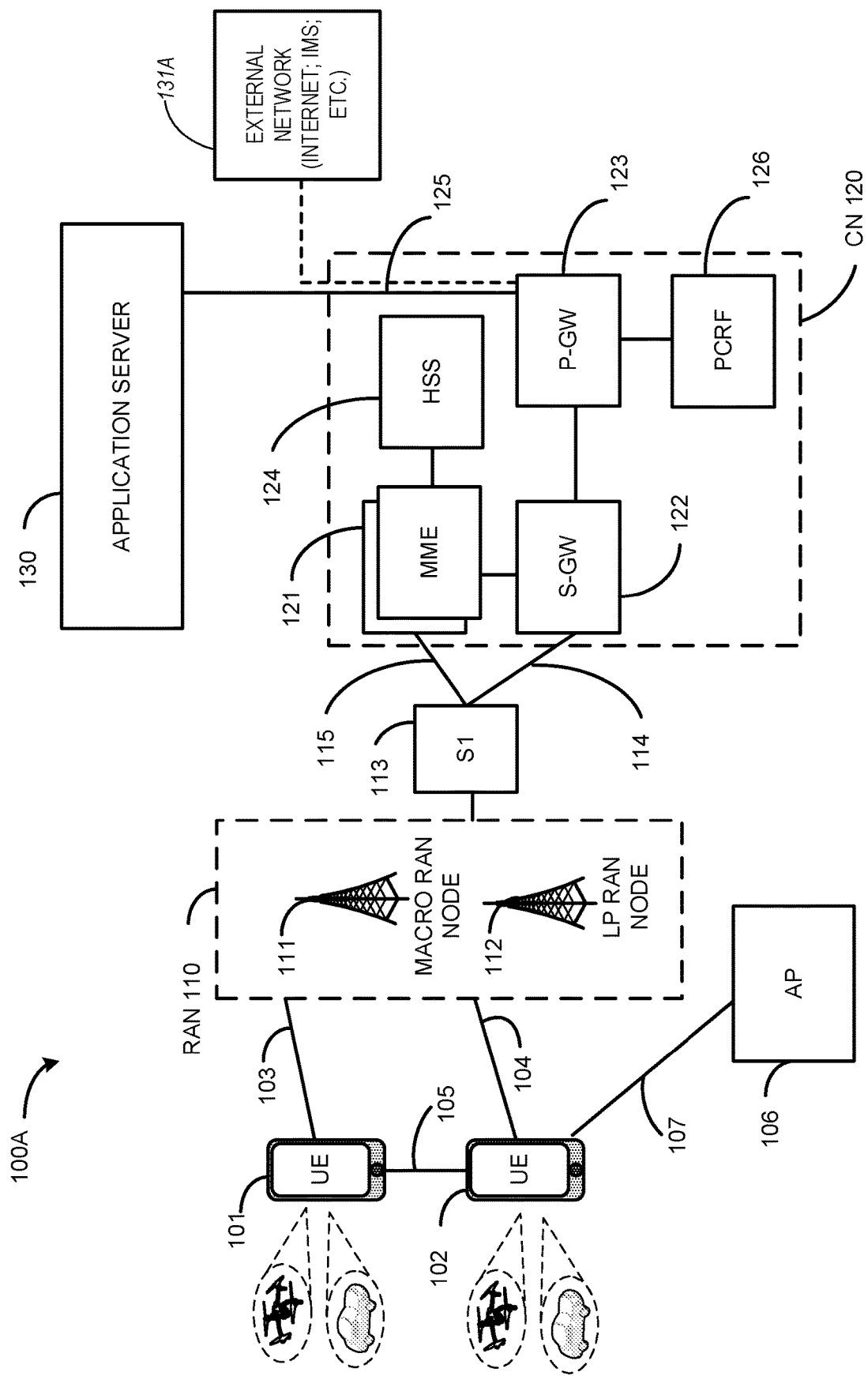
FIG. 1A illustrates an architecture of a network in accordance with some embodiments.

FIG. 1A illustrates an architecture of a system 100A of a network in accordance with some embodiments. In some embodiments, the system 100A may be configured for Vehicle-to-Everything (V2X) operations, for example, operations including indicating V2X capabilities of wireless devices (e.g., user equipment) and authorization of wireless devices to use V2X communications within specific communication interfaces or reference points. Embodiments may also include using such V2X capability and authorization information for handover procedures.

The system 100A, which may include a fourth-generation (4G) system (4GS), a fifth-generation (5G) system (5GS), or a combined 4GS and 5GS, is shown to include a user equipment (UE) 101 and a UE 102, for example a UE configured for V2X communications. The UEs 101 and 102 may be smartphones (e.g., handheld touchscreen mobile computing devices connectable to one or more cellular networks) or any mobile or non-mobile computing device, such as Personal Data Assistants (PDAs), pagers, laptop computers, desktop computers, wireless handsets, or any computing device including a wireless communications interface. In some embodiments, the UE 101 and 102 may be Internet-of-Things (IoT)-enabled devices, configured to communicate with a radio access network (RAN) 110 and/or a core network (CN) 120, including but not limited to vehicles or drones.

In some embodiments, any of the UEs 101 and 102 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101 and 102 may be configured to connect, e.g., communicatively couple, with a radio access network (RAN) 110—the RAN 110 may be, for example, an Evolved Universal Mobile Telecommunications System (UMTS) Terrestrial Radio Access Network (E-UTRAN), a NextGen RAN (NG-RAN), 5G RAN, or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as a connection consistent with any IEEE 802.11 protocol, wherein the AP 106 would comprise a wireless fidelity (WiFi®) router. In this example, the AP 106 is shown to be connected to the Internet without connecting to the core network of the wireless system (described in further detail below).

The RAN 110 can include one or more access nodes (e.g., E-UTRA nodes) that enable the connections 103 and 104, for example, for V2X operations. These access nodes (ANs) can be referred to as base stations (BSs), NodeBs, evolved NodeBs (eNBs), next Generation NodeBs (e.g., gNB, ng-eNB), RAN nodes, and so forth, and can comprise ground stations (e.g., terrestrial access points) or satellite stations providing coverage within a geographic area (e.g., a cell). In some embodiments, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. In some embodiments, a NodeB can be a E-UTRA-NR (EN)-gNB (en-gNB) configured to support E-UTRA-NR Dual Connectivity (EN-DC) (e.g., multi-RAT Dual Connectivity (MR-DC)), in which a UE may be connected to one eNB that acts as a master node (MN) and one en-gNB that acts as a secondary node (SN).

The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a new generation node-B (gNB), an evolved node-B (eNB), or another type of RAN node.

In accordance with some embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid may comprise a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 101 and 102. The physical downlink control channel (PDCCH)

may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 110 is shown to be communicatively coupled to a core network (CN) 120 via an S1 interface 113. In embodiments, the CN 120 may be an evolved packet core (EPC) network, a NextGen Packet Core (NPC) network, or some other type of CN (e.g., as illustrated in reference to FIGS. 1B-1J). In this embodiment the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMES 121.

In this embodiment, the CN 120 comprises the MMES 121, the S-GW 122, the Packet Data Network (PDN) Gateway (P-GW) 123, and a home subscriber server (HSS) 124. The MMES 121 may be similar in function to the control plane of legacy Serving General Packet Radio Service (GPRS) Support Nodes (SGSN). The MMES 121 may manage mobility embodiments in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities may include lawful intercept, charging, and some policy enforcement. The P-GW 123 may terminate an SGi interface toward a PDN. The P-GW 123 may route data packets between the EPC network 123 and external networks such as a network including the application server 130 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 130 may be an element offering applications that use IP bearer resources with the core network (e.g., UMTS Packet Services (PS) domain, LTE PS data services, etc.). In this embodiment, the P-GW 123 is shown to be communicatively coupled to an application server 130 via an IP communications interface 125. The application server 130 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Enforcement Function (PCRF) 126 is the policy and charging control element of the CN 120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 may be communicatively coupled to the application server 130 via the P-GW 123. The application server 130 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 130.

In an example, any of the nodes 111 or 112 can be configured to communicate to the UEs 101, 102 (e.g., dynamically) by an antenna panel selection and a receive (Rx) beam selection that can be used by the UE for data reception on a physical downlink shared channel (PDSCH) as well as for channel state information reference signal (CSI-RS) measurements and channel state information (CSI) calculation. In an example, any of the nodes 111 or 112 can be configured to communicate to the UEs 101, 102 (e.g., dynamically) by an antenna panel selection and a transmit (Tx) beam selection that can be used by the UE for data transmission on a physical uplink shared channel (PUSCH) as well as for sounding reference signal (SRS) transmission.

In some embodiments, the communication network 100B can be an IoT network. One of the current enablers of IoT is the narrowband-IoT (NB-IoT). NB-IoT has objectives such as coverage extension, UE complexity reduction, long battery lifetime, and backward compatibility with the LTE network. In addition, NB-IoT aims to offer deployment flexibility allowing an operator to introduce NB-IoT using a small portion of its existing available spectrum, and operate in one of the following three modalities: (a) standalone deployment (the network operates in re-farmed GSM spectrum); (b) in-band deployment (the network operates within the LTE channel); and (c) guard-band deployment (the network operates in the guard band of legacy LTE channels). In some embodiments, such as with further enhanced NB-IoT (FeNB-IoT), support for NB-IoT in small cells can be provided (e.g., in microcell, picocell or femtocell deployments). One of the challenges NB-IoT systems face for small cell support is the UL/DL link imbalance, where for small cells the base stations have lower power available compared to macro-cells, and, consequently, the DL coverage can be affected and/or reduced. In addition, some NB-IoT UEs can be configured to transmit at maximum power if repetitions are used for UL transmission. This may result in large inter-cell interference in dense small cell deployments.

Figure 1B:
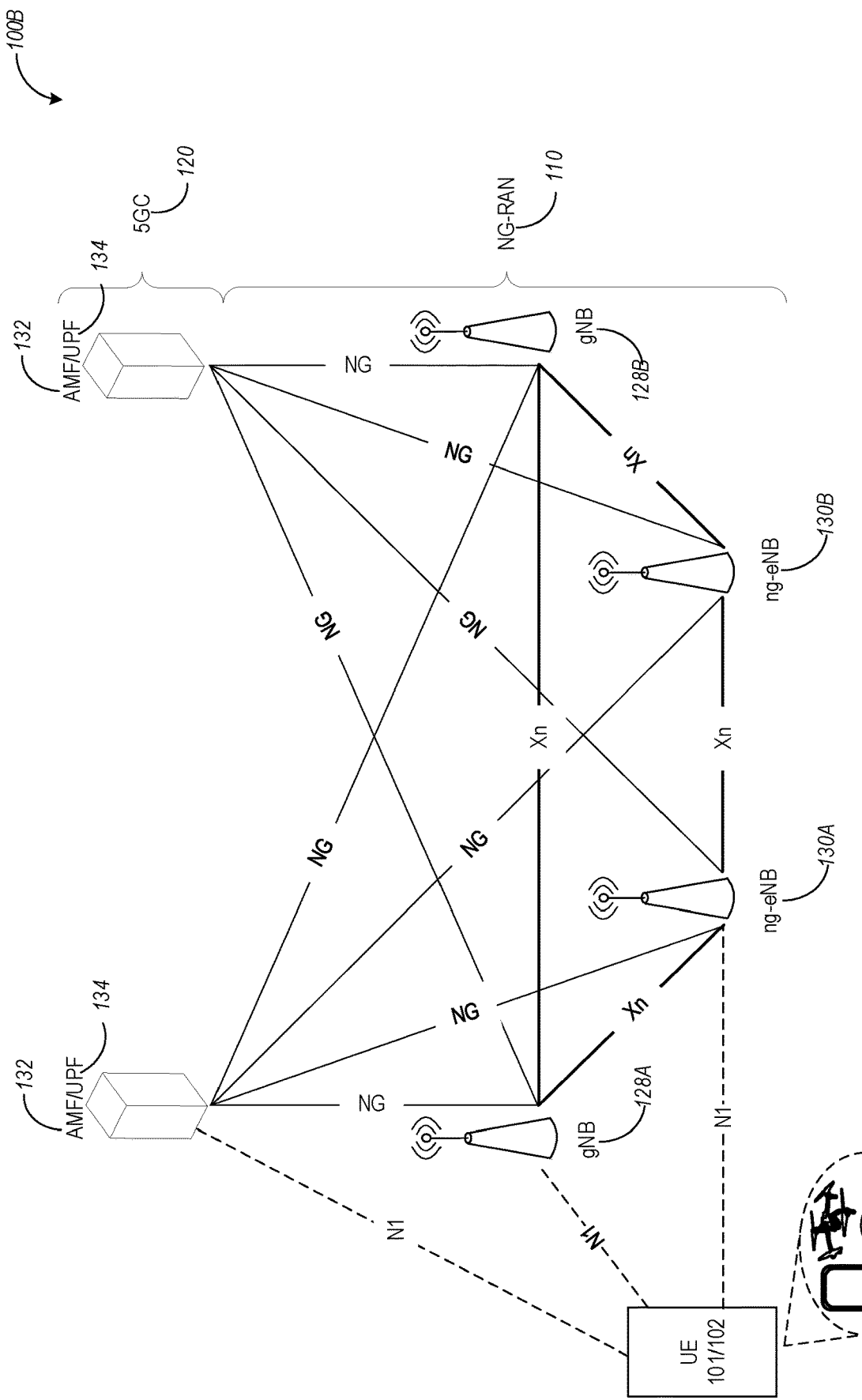
FIG. 1B is a simplified diagram of an overall Next-Generation (NG) system architecture in accordance with some embodiments.

FIG. 1B illustrates an exemplary Next Generation (NG) system architecture 100B in accordance with some embodiments. The system 100B may include a fourth-generation (4G) system (4GS), a fifth-generation (5G) system (5GS), or a combined 4GS and 5GS. Referring to FIG. 1B, the NG system architecture 100B includes NG-RAN 110 and a 5G network core (5GC) 120. The NG-RAN 110 can include a plurality of NG-RAN nodes, for example, gNBs 128A and 128B, and NG-eNBs 130A and 130B. The gNBs 128A/128B and the NG-eNBs 130A/130B can be communicatively coupled to the UE 102 via, for example, an N1 interface. The core network 120 (e.g., a 5G core network or 5GC) can include an access and mobility management function (AMF) 132 and/or a user plane function (UPF) 134. The AMF 132 and the UPF 134 can be communicatively coupled to the gNBs 128A/128B and the NG-eNBs 130A/130B via NG interfaces. More specifically, in some embodiments, the gNBs 128A/128B and the NG-eNBs 130A/130B can be connected to the AMF 132 by NG-C interfaces, and to the UPF 134 by NG-U interfaces. The gNBs 128A/128B and the NG-eNBs 130A/130B can be coupled to each other via Xn interfaces.

In some embodiments, a gNB 128 can include a node providing New Radio (NR) user plane and control plane protocol termination towards the UE, and can be connected via the NG interface to the 5GC 120. In some embodiments, an NG-eNB 130 can include a node providing evolved universal terrestrial radio access (E-UTRA) user plane and control plane protocol terminations towards the UE, and is connected via the NG interface to the 5GC 120. In some embodiments, any of the gNBs 128A/128B and the NG-eNBs 130A/130B can be implemented as a base station (BS), a mobile edge server, a small cell, a home eNB, although embodiments are not so limited.

Figure 1C:
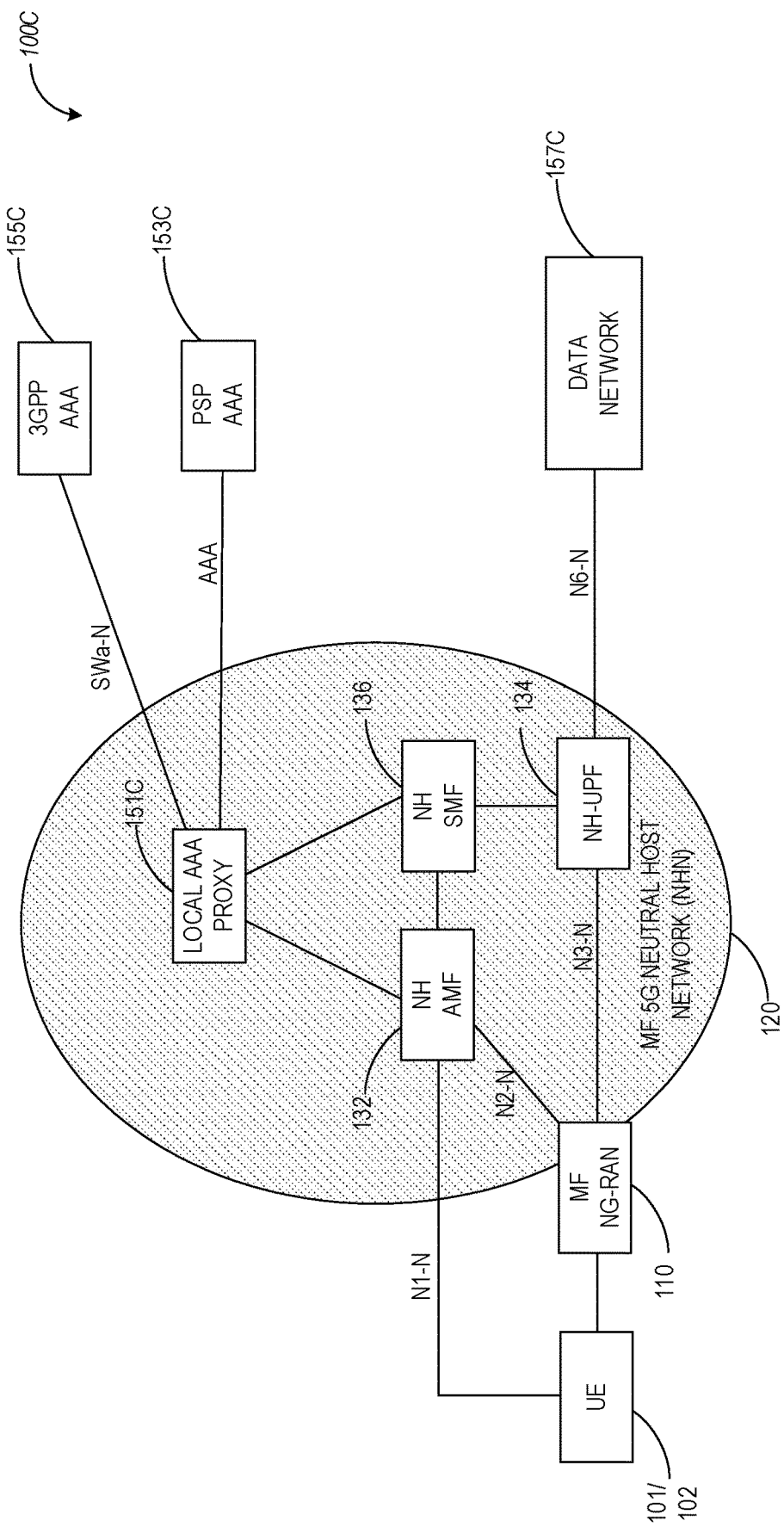
FIG. 1C illustrates an example MulteFire Neutral Host Network (NHN) 5G architecture in accordance with some embodiments.

FIG. 1C illustrates an example MulteFire Neutral Host Network (NHN) 5G architecture 100C in accordance with some embodiments. Referring to FIG. 1C, the MulteFire 5G architecture 100C can include the UE 102, NG-RAN 110, and core network 120. The NG-RAN 110 can be a MulteFire NG-RAN (MF NG-RAN), and the core network 120 can be a MulteFire 5G neutral host network (NHN). In some embodiments, the MF NHN 120 can include a neutral host AMF (NH AMF) 132, a NH SMF 136, a NH UPF 134, and a local AAA proxy 151C. The AAA proxy 151C can provide connection to a 3GPP AAA server 155C and a participating service provider AAA (PSP AAA) server 153C. The NH-UPF 134 can provide a connection to a data network 157C.

The MF NG-RAN 120 can provide similar functionalities as an NG-RAN operating under a 3GPP specification. The NH-AMF 132 can be configured to provide similar functionality as a AMF in a 3GPP 5G core network (e.g., as described in reference to FIG. 1D). The NH-SMF 136 can be configured to provide similar functionality as a SMF in a 3GPP 5G core network (e.g., as described in reference to FIG. 1D). The NH-UPF 134 can be configured to provide similar functionality as a UPF in a 3GPP 5G core network (e.g., as described in reference to FIG. 1D).

Figure 1D:
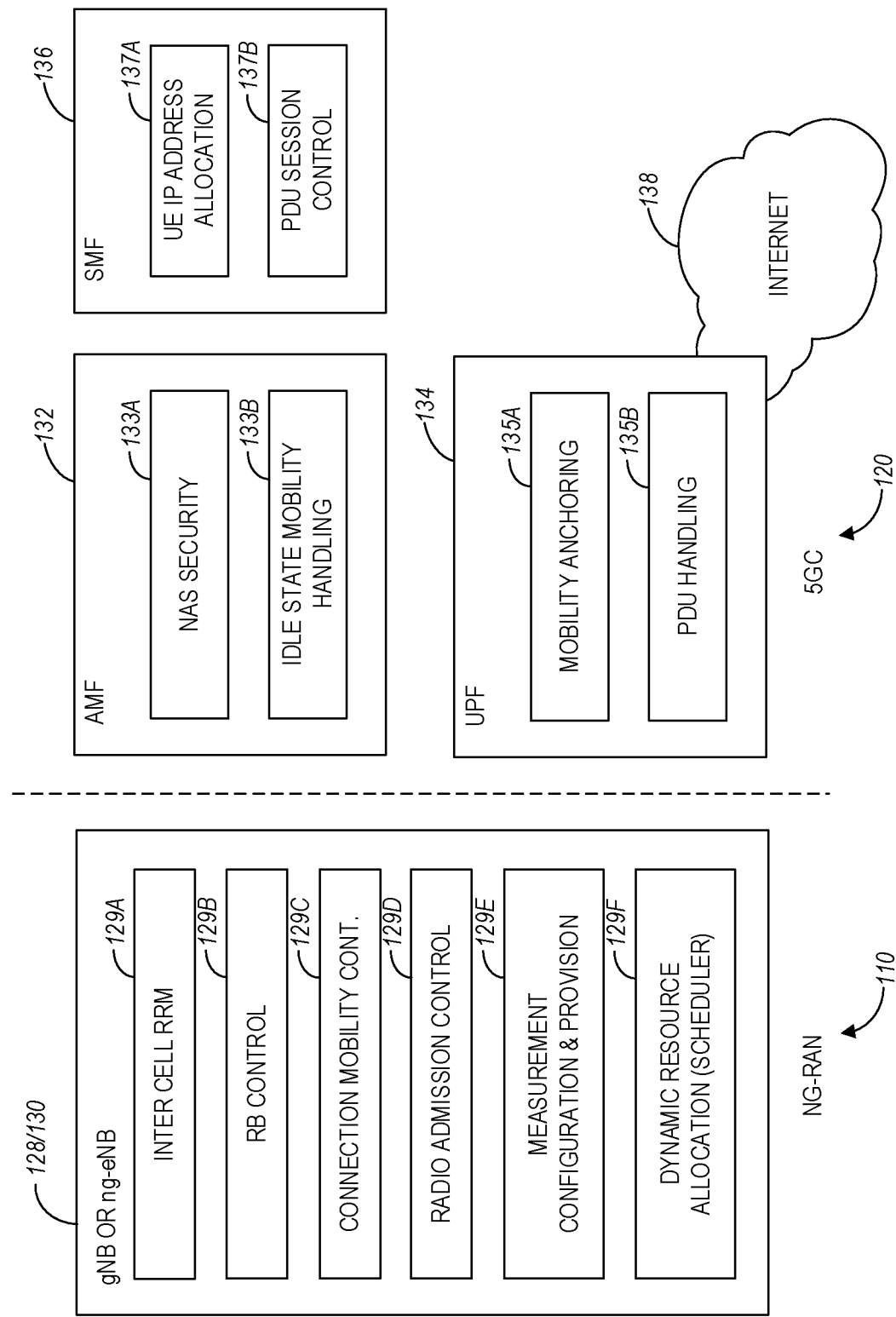
FIG. 1D illustrates a functional split between next generation radio access network (NG-RAN) and the 5G Core network (5GC) in accordance with some embodiments.

FIG. 1D illustrates a functional split between NG-RAN and the 5G Core (5GC) in accordance with some embodiments. FIG. 1D illustrates some of the functionalities the gNBs 128A/128B and the NG-eNBs 130A/130B can perform within the NG-RAN 110, as well as the AMF 132, the UPF 134, and a Session Management Function (SMF) 136 within the 5GC 120. In some embodiments, the 5GC 120 can provide access to the Internet 138 to one or more devices via the NG-RAN 110.

In some embodiments, the gNBs 128A/128B and the NG-eNBs 130A/130B can be configured to host the following functions: functions for Radio Resource Management (e.g., inter-cell radio resource management 129A, radio bearer control 129B, connection mobility control 129C, radio admission control 129D, dynamic allocation of resources to UEs in both uplink and downlink (scheduling) 129F); IP header compression; encryption and integrity protection of data; selection of an AMF at UE attachment when no routing to an AMF can be determined from the information provided by the UE; routing of User Plane data towards UPF(s); routing of Control Plane information towards AMF; connection setup and release; scheduling and transmission of paging messages (originated from the AMF); scheduling and transmission of system broadcast information (originated from the AMF or Operation and Maintenance); measurement and measurement reporting configuration for mobility and scheduling 129E; transport level packet marking in the uplink; session management; support of network slicing; QoS flow management and mapping to data radio bearers; support of UEs in RRC_INACTIVE state; distribution function for non-access stratum (NAS) messages; radio access network sharing; dual connectivity; and tight interworking between NR and E-UTRA, to name a few.

In some embodiments, the AMF 132 can be configured to host the following functions, for example: NAS signaling termination; NAS signaling security 133A; access stratum (AS) security control; inter core network (CN) node signaling for mobility between 3GPP access networks; idle state/mode mobility handling 133B, including mobile device, such as a UE reachability (e.g., control and execution of paging retransmission); registration area management; support of intra-system and inter-system mobility; access authentication; access authorization including check of roaming rights; mobility management control (subscription and policies); support of network slicing; and/or SMF selection, among other functions.

The UPF 134 can be configured to host the following functions, for example: mobility anchoring 135A (e.g., anchor point for Intra-/Inter-RAT mobility); packet data unit (PDU) handling 135B (e.g., external PDU session point of interconnect to data network); packet routing and forwarding; packet inspection and user plane part of policy rule enforcement; traffic usage reporting; uplink classifier to support routing traffic flows to a data network; branching point to support multi-homed PDU session; QoS handling for user plane, e.g., packet filtering, gating, UL/DL rate enforcement; uplink traffic verification (SDF to QoS flow mapping); and/or downlink packet buffering and downlink data notification triggering, among other functions. The Session Management function (SMF) 136 can be configured to host the following functions, for example: session management; UE IP address allocation and management 137A; selection and control of user plane function (UPF); PDU session control 137B, including configuring traffic steering at UPF 134 to route traffic to proper destination; control part of policy enforcement and QoS; and/or downlink data notification, among other functions.

Figure 1E:
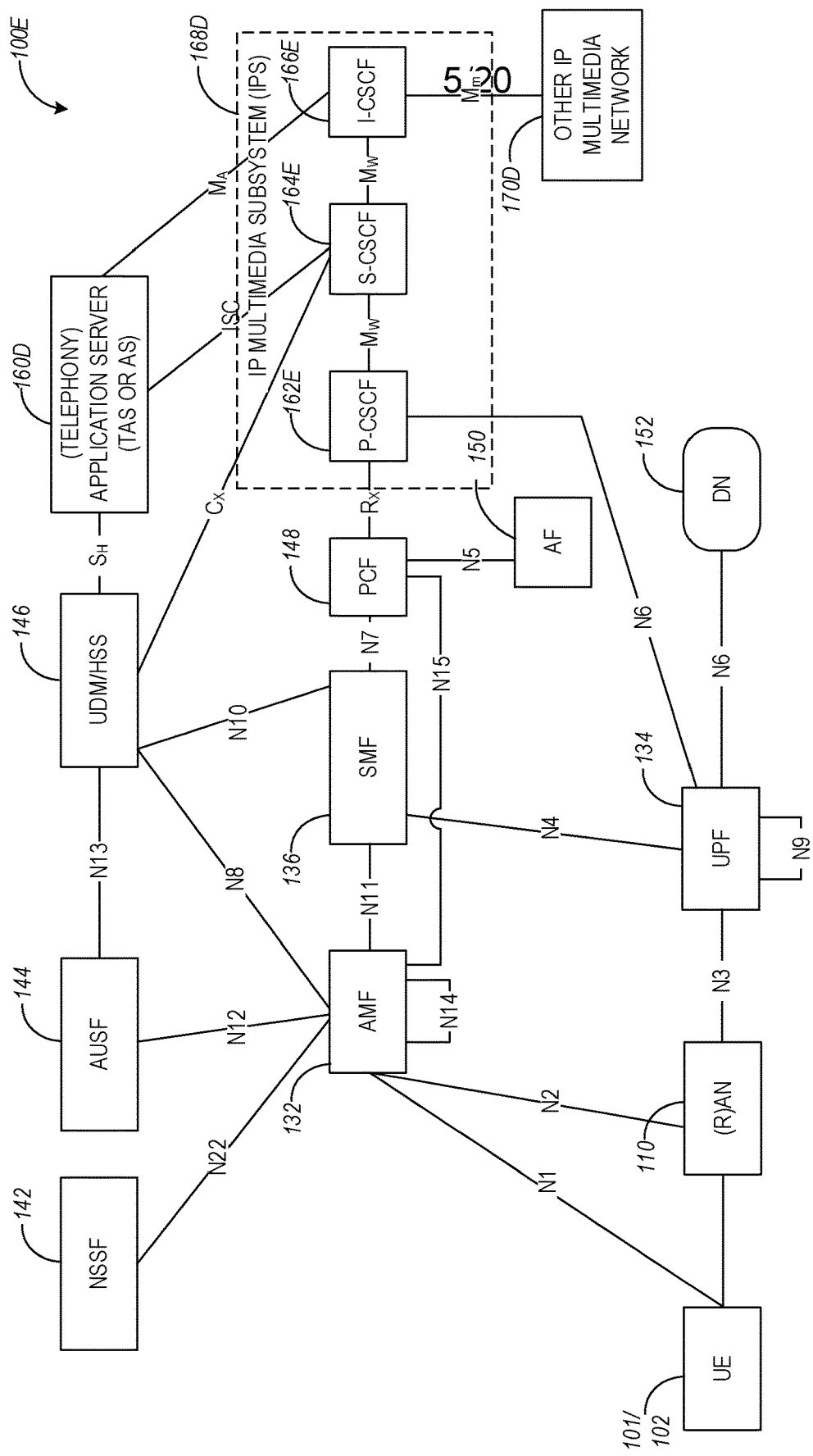
FIG. 1E illustrates a non-roaming 5G system architecture in accordance with some embodiments.
Figure 1F:
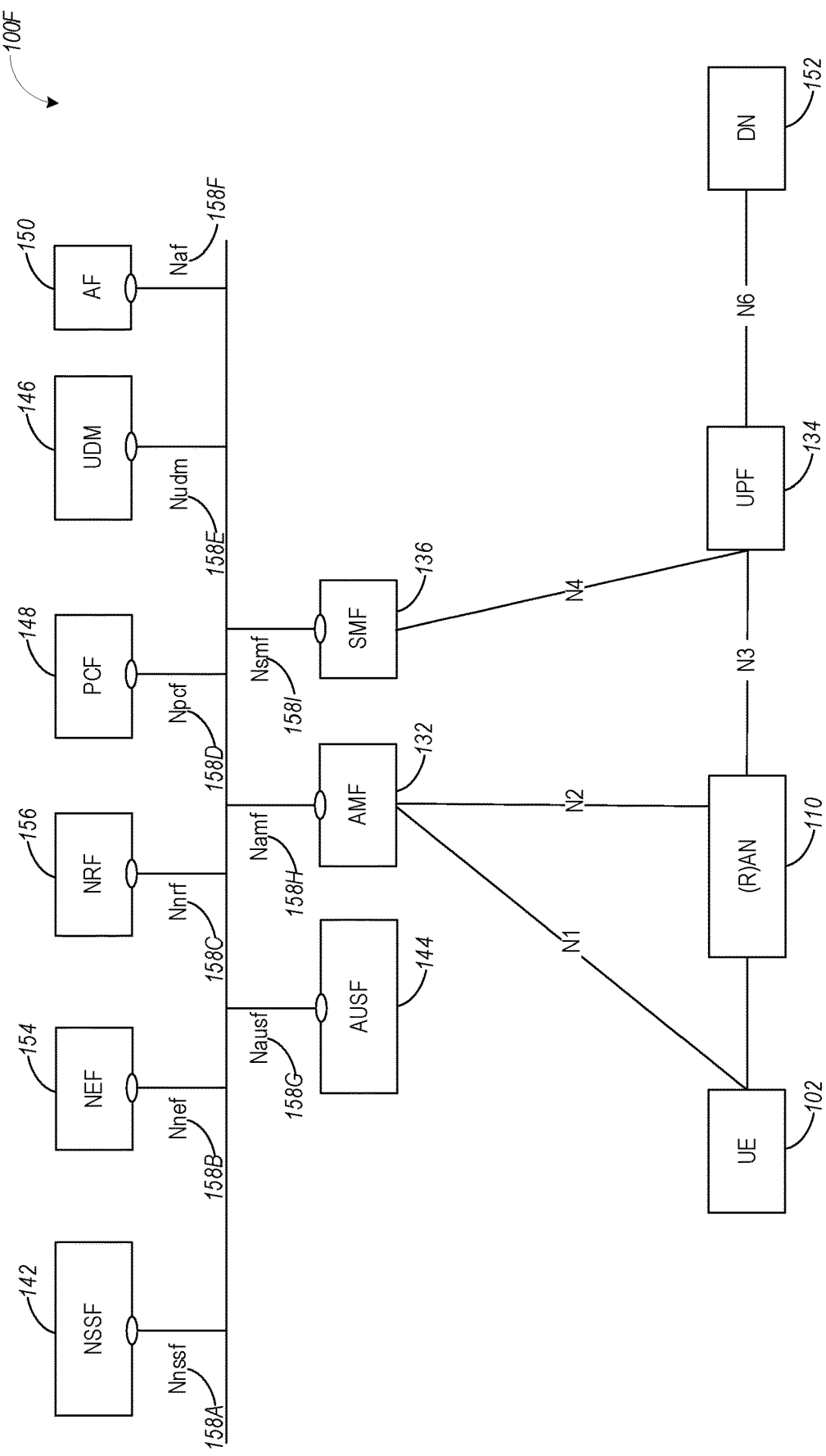
FIG. 1F illustrates a non-roaming 5G system architecture in accordance with some embodiments.

FIG. 1E and FIG. 1F illustrate a non-roaming 5G system architecture in accordance with some embodiments. Referring to FIG. 1E, an exemplary 5G system architecture 100E, of a 5G system, in a reference point representation is illustrated. More specifically, UE 102 can be in communication with RAN 110 as well as one or more other 5G core (5GC) network entities. The 5G system architecture 100E includes a plurality of network functions (NFs), such as access and mobility management function (AMF) 132, session management function (SMF) 136, policy control function (PCF) 148, application function (AF) 150, user plane function (UPF) 134, network slice selection function (NSSF) 142, authentication server function (AUSF) 144, and unified data management (UDM)/home subscriber server (HSS) 146. The UPF 134 can provide a connection to a data network (DN) 152, which can include, for example, operator services, Internet access, or third-party services. The AMF can be used to manage access control and mobility, and can also include network slice selection functionality. The SMF can be configured to set up and manage various sessions according to a network policy. The UPF can be deployed in one or more configurations according to a desired service type. The PCF can be configured to provide a policy framework using network slicing, mobility management, and roaming (similar to PCRF in a 4G communication system). The UDM can be configured to store subscriber profiles and data (similar to an HSS in a 4G communication system).

In some embodiments, the 5G system architecture 100E includes an IP multimedia subsystem (IMS) 168E as well as a plurality of IP multimedia core network subsystem entities, such as call session control functions (CSCFs). More specifically, the IMS 168E includes a CSCF, which can act as a proxy CSCF (P-CSCF) 162E, a serving CSCF (S-CSCF) 164E, an emergency CSCF (E-CSCF) (not illustrated in FIG. 1E), and/or interrogating CSCF (I-CSCF) 166E. The P-CSCF 162E can be configured to be the first contact point for the UE 102 within the IM subsystem (IMS) 168E. The S-CSCF 164E can be configured to handle the session states in the network, and the E-CSCF can be configured to handle certain embodiments of emergency sessions such as routing an emergency request to the correct emergency center or public safety answering point (PSAP). The I-CSCF 166E can be configured to function as the contact point within an operator's network for all IMS connections destined to a subscriber of that network operator, or a roaming subscriber currently located within that network operator's service area. In some embodiments, the I-CSCF 166E can be connected to another IP multimedia network 170E, e.g. an IMS operated by a different network operator.

In some embodiments, the UDM/HSS 146 can be coupled to an application server 160E, which can include a telephony application server (TAS) or another application server (AS). The AS 160E can be coupled to the IMS 168E via the S-CSCF 164E and/or the I-CSCF 166E. In some embodiments, the 5G system architecture 100E can use a unified access barring mechanism using one or more of the techniques described herein, which access barring mechanism can be applicable for all RRC states of the UE 102, such as RRC_IDLE, RRC_CONNECTED, and RRC_INACTIVE states.

In some embodiments, the 5G system architecture 100E can be configured to use 5G access control mechanism techniques described herein, based on access categories that can be categorized by a minimum default set of access categories, which are common across all networks. This functionality can allow the public land mobile network PLMN, such as a visited PLMN (VPLMN) to protect the network against different types of registration attempts, enable acceptable service for the roaming subscriber and enable the VPLMN to control access attempts aiming at receiving certain basic services. It also provides more options and flexibility to individual operators by providing a set of access categories, which can be configured and used in operator specific ways.

FIG. 1F illustrates an exemplary 5G system architecture 100F and a service-based representation. System architecture 100F can be substantially similar to (or the same as) system architecture 100E. In addition to the network entities illustrated in FIG. 1E, system architecture 100F can also include a network exposure function (NEF) 154 and a network repository function (NRF) 156. In some embodiments, 5G system architectures can be service-based and interaction between network functions can be represented by corresponding point-to-point reference points N1 (as illustrated in FIG. 1E) or as service-based interfaces (as illustrated in FIG. 1F).

A reference point representation shows that an interaction can exist between corresponding NF services. For example, FIG. 1E illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150), N6 (between the UPF 134 and the DN 152), N7 (between the SMF 136 and the PCF 148), N8 (between the UDM 146 and the AMF 132), N9 (between two UPFs 134), N10 (between the UDM 146 and the SMF 136), N11 (between the AMF 132 and the SMF 136), N12 (between the AUSF 144 and the AMF 132), N13 (between the AUSF 144 and the UDM 146), N14 (between two AMFs 132), N15 (between the PCF 148 and the AMF 132 in case of a non-roaming scenario, or between the PCF 148 and a visited network and AMF 132 in case of a roaming scenario), N16 (between two SMFs; not illustrated in FIG. 1E), and N22 (between AMF 132 and NSSF 142). Other reference point representations not shown in FIG. 1E can also be used.

In some embodiments, as illustrated in FIG. 1F, service-based representations can be used to represent network functions within the control plane that enable other authorized network functions to access their services. In this regard, 5G system architecture 100F can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1F can also be used.

Figure 1G:
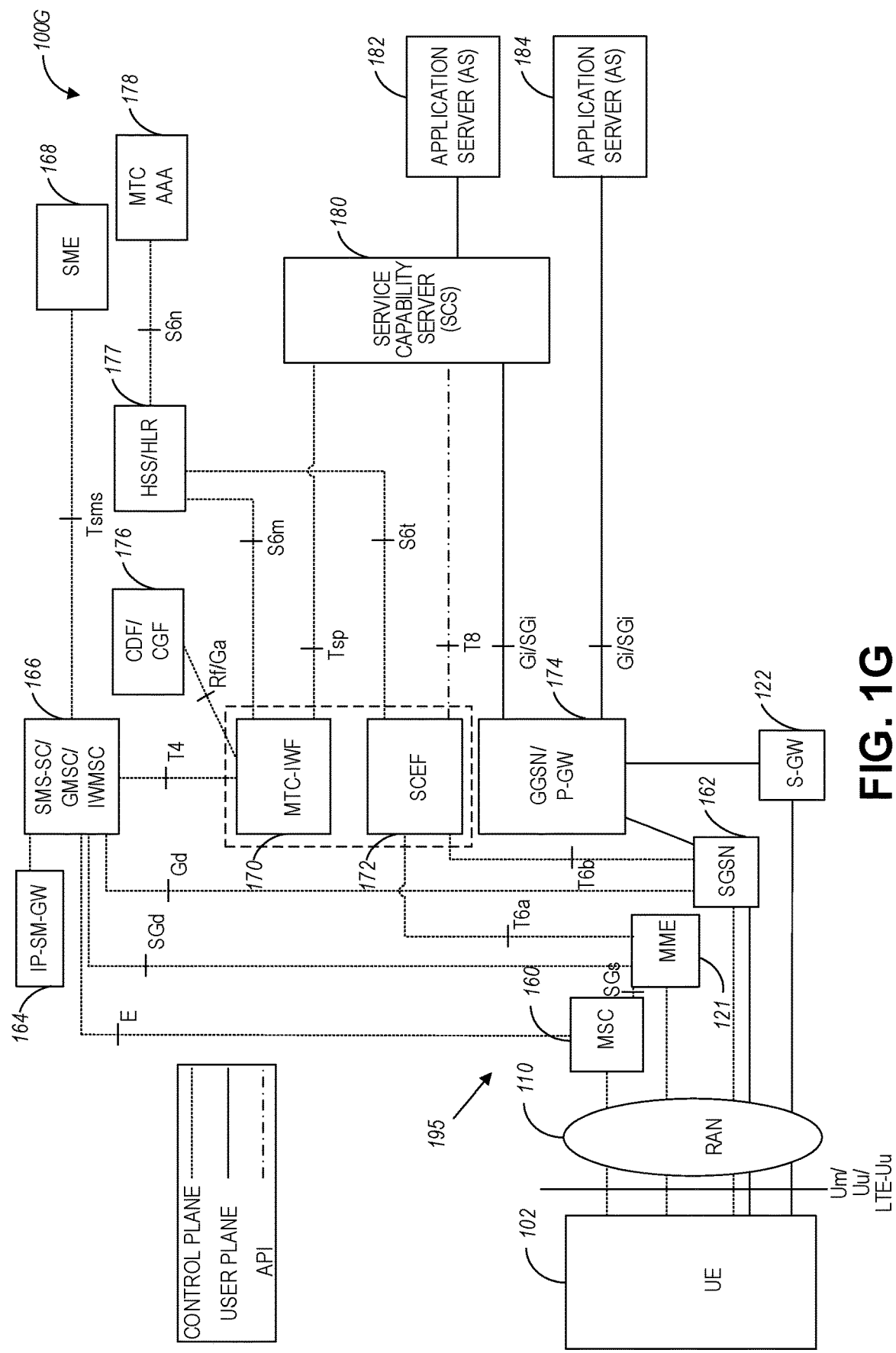
FIG. 1G illustrates an example Cellular Internet-of-Things (CIoT) network architecture in accordance with some embodiments.

FIG. 1G illustrates an exemplary consumer IoT (CIoT) network architecture in accordance with some embodiments. Referring to FIG. 1G, the CIoT architecture 100G can include the UE 102 and the RAN 110 coupled to a plurality of core network entities. In some embodiments, the UE 102 can be a machine-type communication (MTC) UE. The CIoT network architecture 100G can further include a mobile services switching center (MSC) 160, MME 121, a serving GPRS support note (SGSN) 162, a S-GW 122, an IP-Short-Message-Gateway (IP-SM-GW) 164, a Short Message Service Service Center (SMS-SC)/gateway mobile service center (GMSC)/Interworking MSC (IWMSC) 166, MTC interworking function (MTC-IWF) 170, a Service Capability Exposure Function (SCEF) 172, a gateway GPRS support node (GGSN)/Packet-GW (P-GW) 174, a charging data function (CDF)/charging gateway function (CGF) 176, a home subscriber server (HSS)/a home location register (HLR) 177, short message entities (SME) 168, MTC authorization, authentication, and accounting (MTC AAA) server 178, a service capability server (SCS) 180, and application servers (AS) 182 and 184. In some embodiments, the SCEF 172 can be configured to securely expose services and capabilities provided by various 3GPP network interfaces. The SCEF 172 can also provide means for the discovery of the exposed services and capabilities, as well as access to network capabilities through various network application programming interfaces (e.g., API interfaces to the SCS 180).

FIG. 1G further illustrates various reference points between different servers, functions, or communication nodes of the CIoT network architecture 100G. Some example reference points related to MTC-IWF 170 and SCEF 172 include the following: Tsms (a reference point used by an entity outside the 3GPP network to communicate with UEs used for MTC via SMS), Tsp (a reference point used by a SCS to communicate with the MTC-IWF related control plane signaling), T4 (a reference point used between MTC-IWF 170 and the SMS-SC 166 in the HPLMN), T6a (a reference point used between SCEF 172 and serving MME 121), T6b (a reference point used between SCEF 172 and serving SGSN 162), T8 (a reference point used between the SCEF 172 and the SCS/AS 180/182), S6$m$ (a reference point used by MTC-IWF 170 to interrogate HSS/HLR 177), S6$n$ (a reference point used by MTC-AAA server 178 to interrogate HSS/HLR 177), and S6$t$ (a reference point used between SCEF 172 and HSS/HLR 177).

In some embodiments, the CIoT UE 102 can be configured to communicate with one or more entities within the CIoT architecture 100G via the RAN 110 according to a Non-Access Stratum (NAS) protocol, and using one or more reference points, such as a narrowband air interface, for example, based on one or more communication technologies, such as Orthogonal Frequency-Division Multiplexing (OFDM) technology. As used herein, the term "CIoT UE" refers to a UE capable of CIoT optimizations, as part of a CIoT communications architecture. In some embodiments, the NAS protocol can support a set of NAS messages for communication between the CIoT UE 102 and an Evolved Packet System (EPS) Mobile Management Entity (MME) 121 and SGSN 162. In some embodiments, the CIoT network architecture 100F can include a packet data network, an operator network, or a cloud service network, having, for example, among other things, a Service Capability Server (SCS) 180, an Application Server (AS) 182, or one or more other external servers or network components.

The RAN 110 can be coupled to the HSS/HLR servers 177 and the AAA servers 178 using one or more reference points including, for example, an air interface based on an Sha reference point, and configured to authenticate/authorize CIoT UE 102 to access the CIoT network. The RAN 110 can be coupled to the CIoT network architecture 100G using one or more other reference points including, for example, an air interface corresponding to an SGi/Gi interface for 3GPP accesses. The RAN 110 can be coupled to the SCEF 172 using, for example, an air interface based on a T6a/T6b reference point, for service capability exposure. In some embodiments, the SCEF 172 may act as an API GW towards a third-party application server such as AS 182. The SCEF 172 can be coupled to the HSS/HLR 177 and MTC AAA 178 servers using an S6$t$ reference point, and can further expose an Application Programming Interface to network capabilities.

In certain examples, one or more of the CIoT devices disclosed herein, such as the CIoT UE 102, the CIoT RAN 110, etc., can include one or more other non-CIoT devices, or non-CIoT devices acting as CIoT devices, or having functions of a CIoT device. For example, the CIoT UE 102 can include a smart phone, a tablet computer, or one or more other electronic device acting as a CIoT device for a specific function, while having other additional functionality. In some embodiments, the RAN 110 can include a CIoT enhanced Node B (CIoT eNB) 111 communicatively coupled to the CIoT Access Network Gateway (CIoT GW) 195. In certain examples, the RAN 110 can include multiple base stations (e.g., CIoT eNBs) connected to the CIoT GW 195, which can include MSC 160, MME 121, SGSN 162, and/or S-GW 122. In certain examples, the internal architecture of RAN 110 and CIoT GW 195 may be left to the implementation and need not be standardized.

As used herein, the term "circuitry" may refer to, be part of, or include an Application Specific Integrated Circuit (ASIC) or other special purpose circuit, an electronic circuit, a processor (shared, dedicated, or group), or memory (shared, dedicated, or group) executing one or more software or firmware programs, a combinational logic circuit, or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. In some embodiments, circuitry as well as modules disclosed herein may be implemented in combinations of hardware, software and/or firmware. In some embodiments, functionality associated with a circuitry can be distributed across more than one piece of hardware or software/firmware module. In some embodiments, modules (as disclosed herein) may include logic, at least partially operable in hardware. Embodiments described herein may be implemented into a system using any suitably configured hardware or software.

Figure 1H:
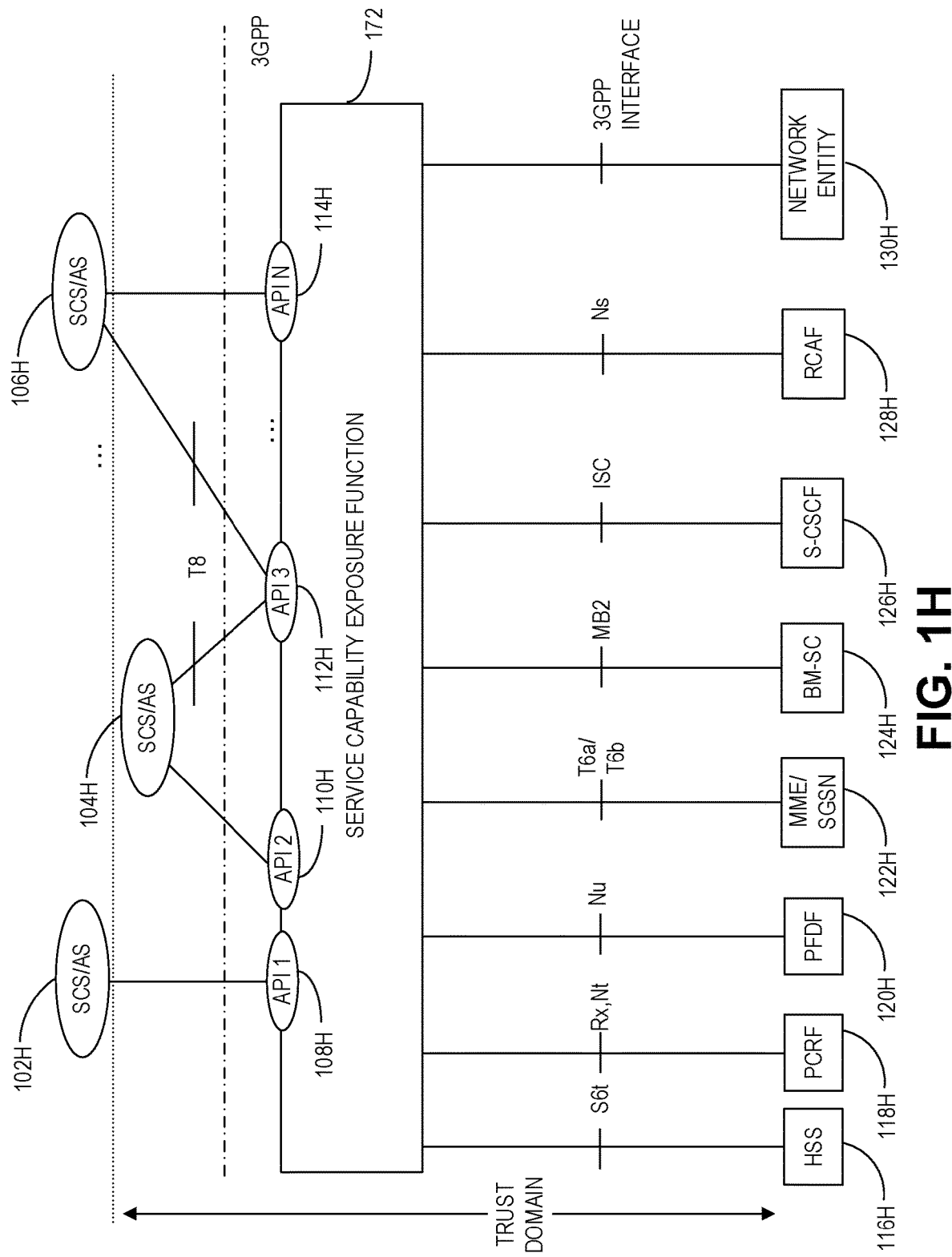
FIG. 1H illustrates an example Service Capability Exposure Function (SCEF) in accordance with some embodiments.

FIG. 1H illustrates an example Service Capability Exposure Function (SCEF) in accordance with some embodiments. Referring to FIG. 1H, the SCEF 172 can be configured to expose services and capabilities provided by 3GPP network interfaces to external third party service provider servers hosting various applications. In some embodiments, a 3GPP network such as the CIoT architecture 100G, can expose the following services and capabilities: a home subscriber server (HSS) 116H, a policy and charging rules function (PCRF) 118H, a packet flow description function (PFDF) 120H, a MME/SGSN 122H, a broadcast multicast service center (BM-SC) 124H, a serving call server control function (S-CSCF) 126H, a RAN congestion awareness function (RCAF) 128H, and one or more other network entities 130H. The above-mentioned services and capabilities of a 3GPP network can communicate with the SCEF 172 via one or more interfaces as illustrated in FIG. 1H. The SCEF 172 can be configured to expose the 3GPP network services and capabilities to one or more applications running on one or more service capability server (SCS)/application server (AS), such as SCS/AS 102H, 104H, . . . , 106H. Each of the SCS/AG 102H-106H can communicate with the SCEF 172 via application programming interfaces (APIs) 108H, 110H, 112H, . . . , 114H, as seen in FIG. 1H.

Figure 1I:
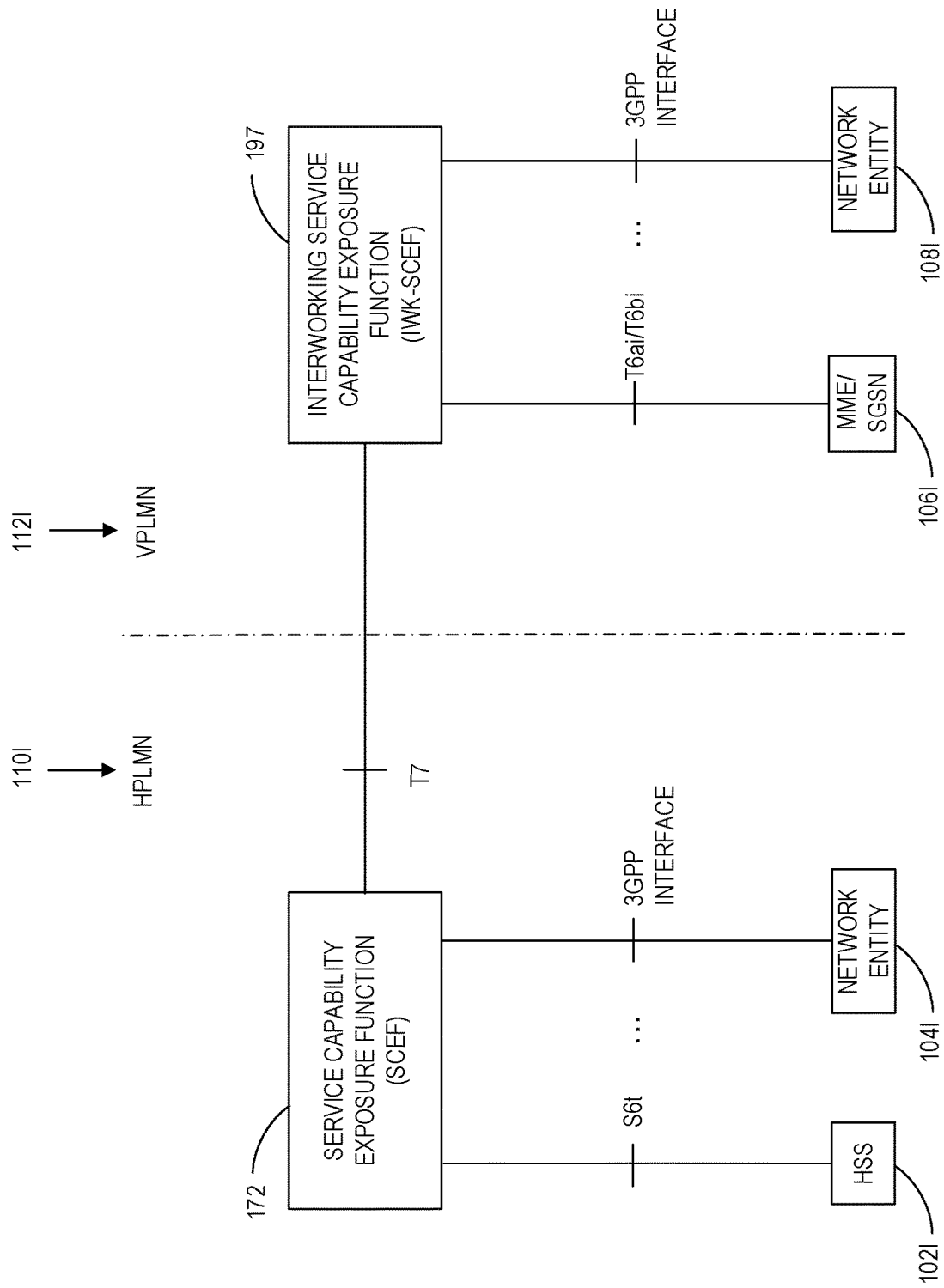
FIG. 1I illustrates an example roaming architecture for SCEF in accordance with some embodiments.

FIG. 1I illustrates an example roaming architecture for SCEF in accordance with some embodiments. Referring to FIG. 1I, the SCEF 172 can be located in HPLMN 110I and can be configured to expose 3GPP network services and capabilities, such as 102I, . . . , 104I. In some embodiments, 3GPP network services and capabilities, such as 106I, . . . , 108I, can be located within VPLMN 112I. In this case, the 3GPP network services and capabilities within the VPLMN 112I can be exposed to the SCEF 172 via an interworking SCEF (IWK-SCEF) 197 within the VPLMN 112I.

Figure 1J:
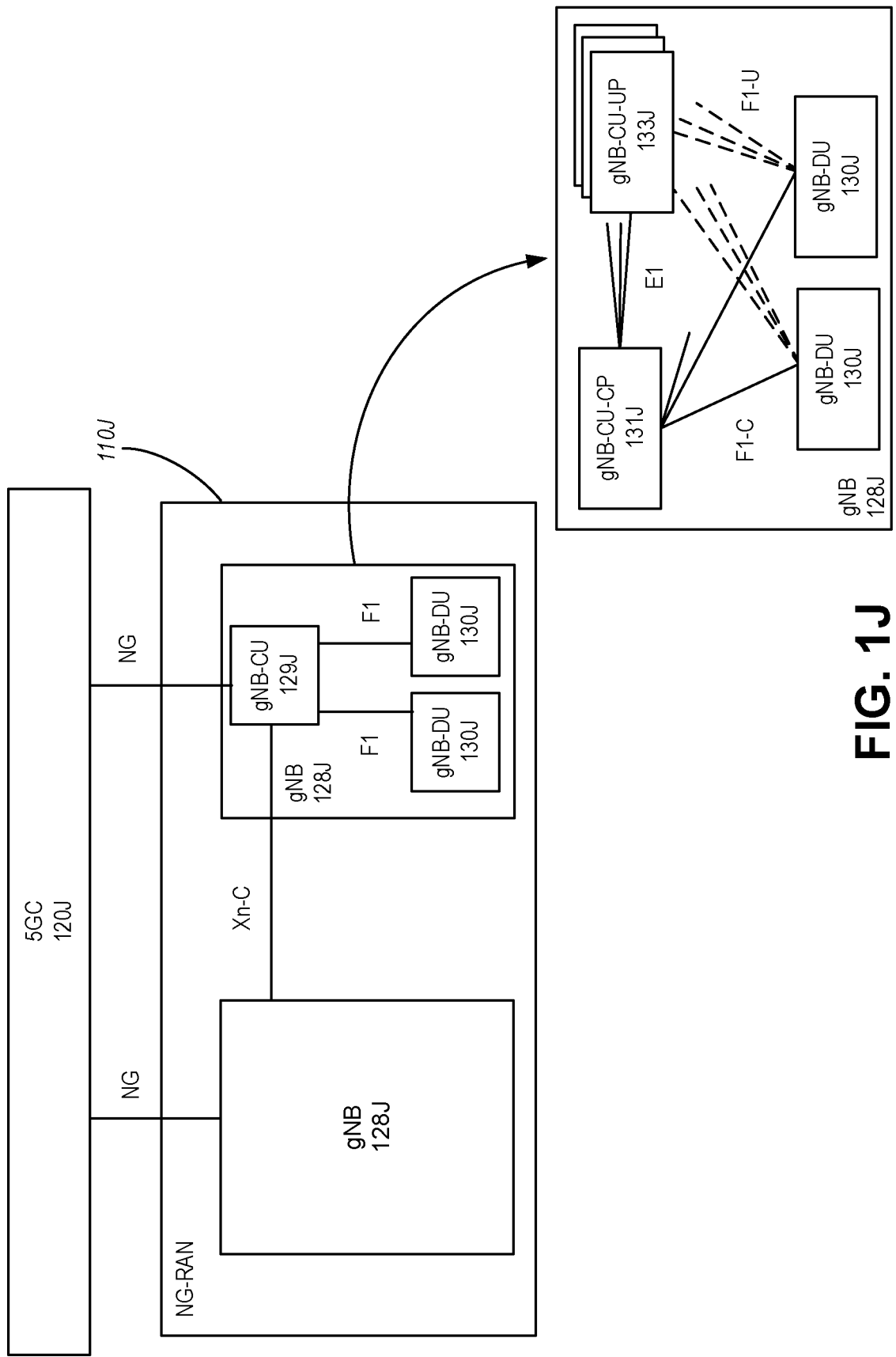
FIG. 1J illustrates components of an exemplary NG Radio Access Network (RAN) architecture, in accordance with some embodiments.

FIG. 1J illustrates an exemplary Next-Generation Radio Access Network architecture, in accordance with some embodiments. The 5GC 120J, the NG-RAN 110J, and the gNBs 128J, in some embodiments, may be similar or the same as the 5GC 120, the NG-RAN 110, and the gNBs 128A/128B of FIG. 1B, respectively. In some embodiments, network elements of the NG-RAN 110 may be split into central and distributed units, and different central and distributed units, or components of the central and distributed units, may be configured for performing different protocol functions. For example, different protocol functions of the protocol layers depicted in FIG. 2, FIG. 5, and FIG. 6.

In some embodiments, the gNB 128J can comprise or be split into one or more of a gNB Central Unit (gNB-CU) 129J and a gNB Distributed Unit (gNB-DU) 130J. Additionally, the gNB 128J can comprise or be split into one or more of a gNB-CU-Control Plane (gNB-CU-CP) 131J and a gNB-CU-User Plane (gNB-CU-UP) 133J. The gNB-CU 129J is a logical node configured to host the radio resource control layer (RRC), service data adaptation protocol (SDAP) layer and packet data convergence protocol layer (PDCP) protocols of the gNB or RRC, and PDCP protocols of the E-UTRA-NR gNB (en-gNB) that controls the operation of one or more gNB-DUs. The gNB-DU 130J is a logical node configured to host the radio link control layer (RLC), medium access control layer (MAC) and physical layer (PHY) layers of the gNB 128A/128B, 128J or en-gNB, and its operation is at least partly controlled by gNB-CU 129J. In some embodiments, one gNB-DU 130J can support one or multiple cells.

The gNB-CU 129J comprises a gNB-CU-Control Plane (gNB-CU-CP) 131J and a gNB-CU-User Plane (gNB-CU-UP) 133J. The gNB-CU-CP 131J is a logical node configured to host the RRC and the control plane part of the PDCP protocol of the gNB-CU 129J for an en-gNB or a gNB. The gNB-CU-UP 133J is a logical node configured to host the user plane part of the PDCP protocol of the gNB-CU 129J for an en-gNB, and the user plane part of the PDCP protocol and the SDAP protocol of the gNB-CU 129J for a gNB.

The gNB-CU 129J and the gNB-DU 130J can communicate via the F1 interface and the gNB 128J can communicate with the gNB-CU via the Xn-C interface. The gNB-CU-CP 131J and the gNB-CU-UP 133J can communicate via the E1 interface. Additionally, the gNB-CU-CP 131J and the gNB-DU 130J can communicate via the F1-C interface, and the gNB-DU 130J and the gNB-CU-UP 133J can communicate via the F1-U interface.

In some embodiments, the gNB-CU 129J terminates the F1 interface connected with the gNB-DU 130J, and in other embodiments, the gNB-DU 130J terminates the F1 interface connected with the gNB-CU 129J. In some embodiments, the gNB-CU-CP 131J terminates the E1 interface connected with the gNB-CU-UP 133J and the F1-C interface connected with the gNB-DU 130J. In some embodiments, the gNB-CU-UP 133J terminates the E1 interface connected with the gNB-CU-CP 131J and the F1-U interface connected with the gNB-DU 130J.

In some embodiments, the F1 interface is a point-to-point interface between endpoints and supports the exchange of signalling information between endpoints and data transmission to the respective endpoints. The F1 interface can support control plane and user plane separation, and separate the Radio Network Layer and the Transport Network Layer. In some embodiments, the E1 interface is a point-to-point interface between a gNB-CU-CP and a gNB-CU-UP and supports the exchange of signalling information between endpoints. The E1 interface can separate the Radio Network Layer and the Transport Network Layer, and in some embodiments, the E1 interface may be a control interface not used for user data forwarding.

Referring to the NG-RAN 110J (e.g., 110 of FIG. 1B), the gNBs 128J of the NG-RAN 110J may communicate to the 5GC via the NG interfaces, and interconnected to other gNBs via the Xn interface. In some embodiments, the gNBs 128J (e.g., 128A/128B) can be configured to support FDD mode, TDD mode or dual mode operation. In certain embodiments, for EN-DC, the S1-U interface and an X2 interface (e.g., X2-C interface) for a gNB, consisting of a gNB-CU and gNB-DUs, can terminate in the gNB-CU.

Figure 2:
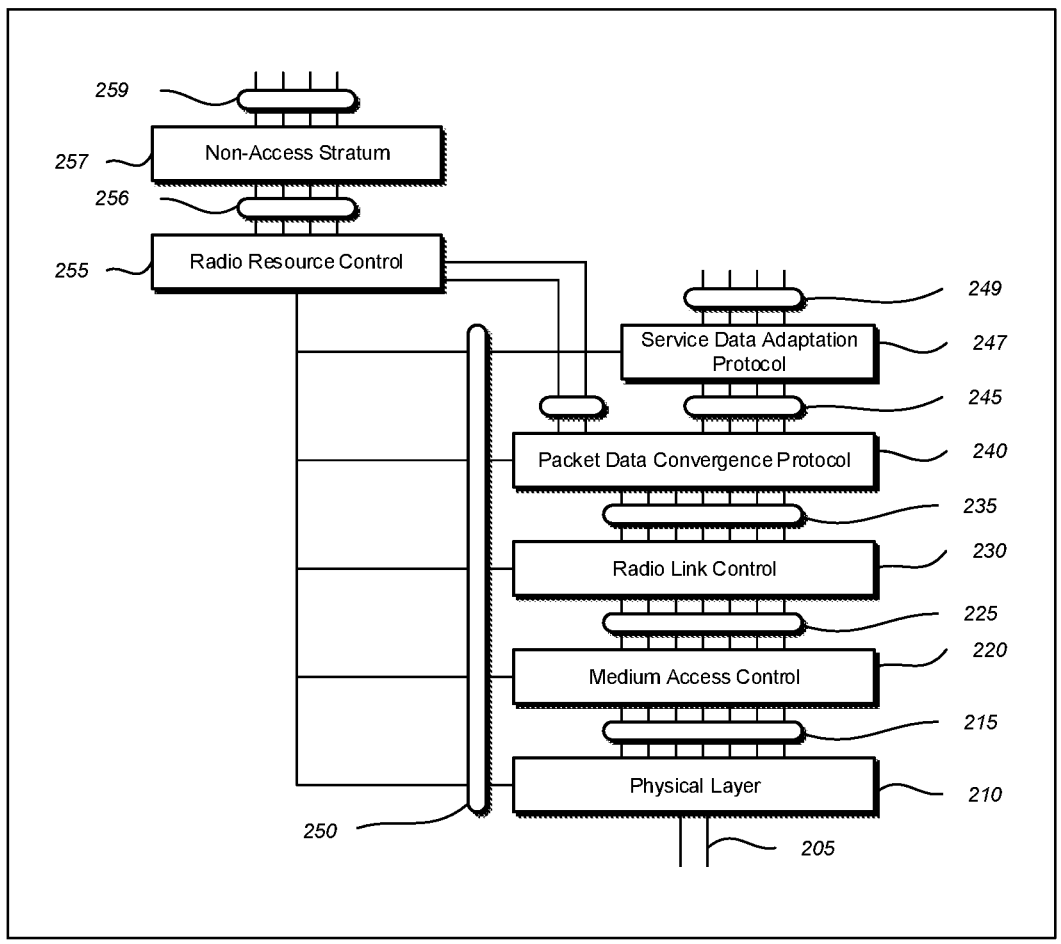
FIG. 2 illustrates protocol functions that may be implemented in a wireless communication device in accordance with some embodiments.

FIG. 2 illustrates protocol functions that may be implemented within and/or by devices of a network architecture, in accordance with some embodiments. For example, such protocol functions may be implemented within wireless communication devices such as UEs and/or a BSs, and any other network entities configured for V2X communications and/or operations.

In some embodiments, protocol layers may include one or more of physical layer (PHY) 210, medium access control layer (MAC) 220, radio link control layer (RLC) 230, packet data convergence protocol layer (PDCP) 240, service data adaptation protocol (SDAP) layer 247, radio resource control layer (RRC) 255, and non-access stratum (NAS) layer 257, in addition to other higher layer functions not illustrated. In some embodiments, the protocol layers may be implemented within and/or by any of the network components of FIGS. 1A-1J, such as the gNBs (e.g., 128A/128B, 128J), and various layers of the protocol functions may be implemented by one or more central or distributed units of the gNBs (e.g., gNB-CU 129J, gNB-DU 130J).

According to some embodiments, protocol layers may include one or more service access points that may provide communication between two or more protocol layers. According to some embodiments, PHY 210 may transmit and receive physical layer signals 205 that may be received or transmitted respectively by one or more other communication devices (e.g., UE 101, UE 102, device 300). According to some embodiments, physical layer signals 205 may comprise one or more physical channels.

According to some embodiments, an instance of PHY 210 may process requests from and provide indications to an instance of MAC 220 via one or more physical layer service access points (PHY-SAP) 215. According to some embodiments, requests and indications communicated via PHY-SAP 215 may comprise one or more transport channels. According to some embodiments, an instance of MAC 210 may process requests from and provide indications to an instance of RLC 230 via one or more medium access control service access points (MAC-SAP) 225. According to some embodiments, requests and indications communicated via MAC-SAP 225 may comprise one or more logical channels.

According to some embodiments, an instance of RLC 230 may process requests from and provide indications to an instance of PDCP 240 via one or more radio link control service access points (RLC-SAP) 235. According to some embodiments, requests and indications communicated via RLC-SAP 235 may comprise one or more RLC channels. According to some embodiments, an instance of PDCP 240 may process requests from and provide indications to one or more of an instance of RRC 255 and one or more instances of SDAP 247 via one or more packet data convergence protocol service access points (PDCP-SAP) 245. According to some embodiments, requests and indications communicated via PDCP-SAP 245 may comprise one or more radio bearers.

According to some embodiments, an instance of SDAP 247 may process requests from and provide indications to one or more higher layer protocol entities via one or more service data adaptation protocol service access points (SDAP-SAP) 249. According to some embodiments, requests and indications communicated via SDAP-SAP 249 may comprise one or more quality of service (QoS) flows. According to some embodiments, RRC entity 255 may configure, via one or more management service access points (M-SAP), embodiments of one or more protocol layers, which may include one or more instances of PHY 210, MAC 220, RLC 230, PDCP 240 and SDAP 247. According to some embodiments, an instance of RRC may process requests from and provide indications to one or more NAS entities via one or more RRC service access points (RRC-SAP).

Figure 3:
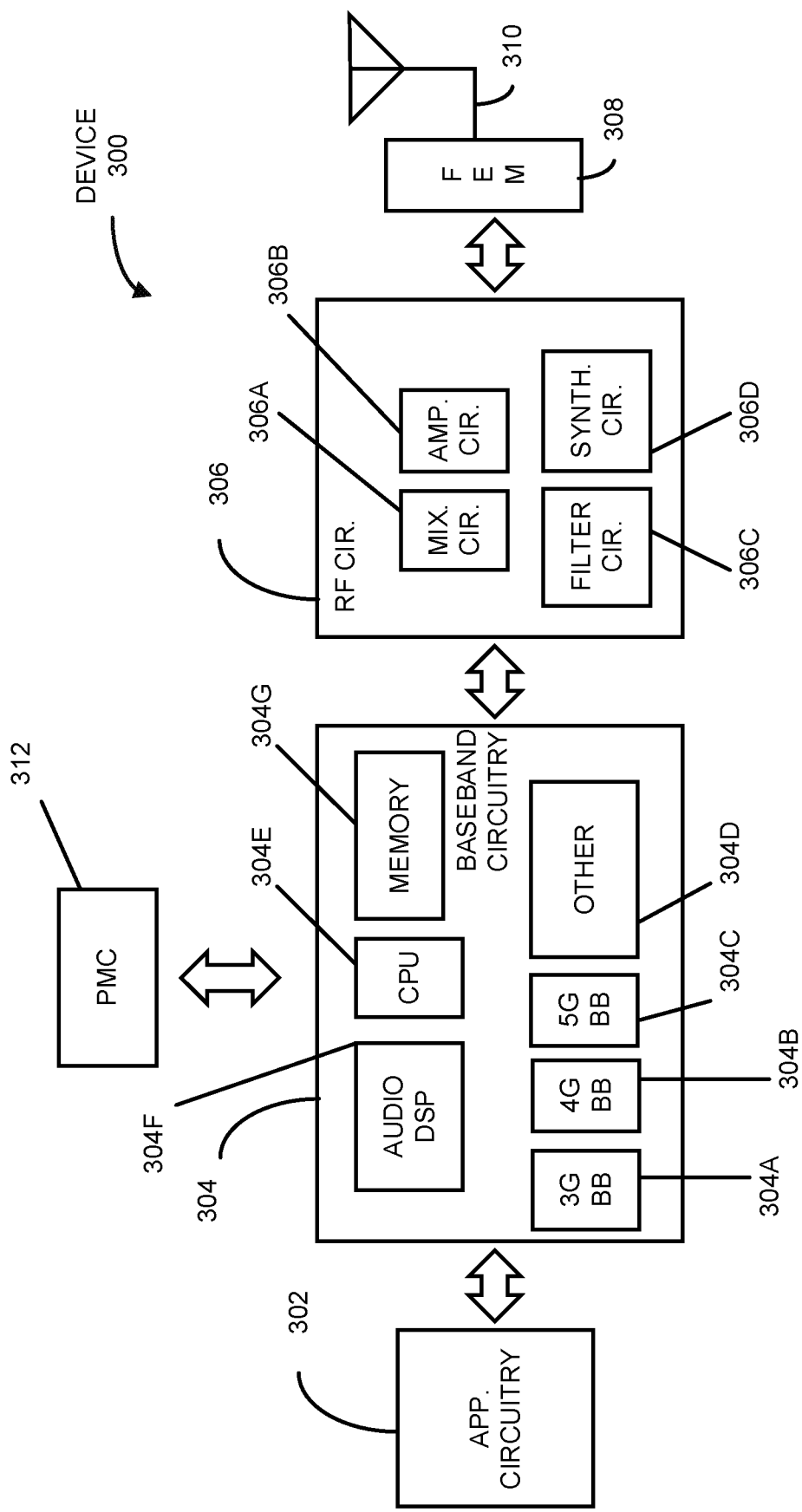
FIG. 3 illustrates example components of a device in accordance with some embodiments.

FIG. 3 illustrates example components of a device 300 in accordance with some embodiments. For example, the device 300 may be a device configured for V2X communications and/or operations (e.g., UE 101, UE 102, UE 260, RAN Node 111/112).

In some embodiments, the device 300 may include application circuitry 302, baseband circuitry 304, Radio Frequency (RF) circuitry 306, front-end module (FEM) circuitry 308, one or more antennas 310, and power management circuitry (PMC) 312 coupled together at least as shown. The components of the illustrated device 300 may be included in a UE (e.g., UE 101, UE 102, UE 260) or a RAN node (e.g., Macro RAN node 111, LP RAN node 112, gNB 280). In some embodiments, the device 300 may include less elements (e.g., a RAN node may not utilize application circuitry 302, and instead may include a processor/controller to process IP data received from an EPC). In some embodiments, the device 300 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 302 may include one or more application processors. For example, the application circuitry 302 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 300. In some embodiments, processors of application circuitry 302 may process IP data packets received from an EPC.

The baseband circuitry 304 may include circuitry such as, but not limited to, one or more single-core or multi-core processors. The baseband circuitry 304 may include one or more baseband processors or control logic to process baseband signals received from a receive signal path of the RF circuitry 306 and to generate baseband signals for a transmit signal path of the RF circuitry 306. Baseband processing circuitry 304 may interface with the application circuitry 302 for generation and processing of the baseband signals and for controlling operations of the RF circuitry 306. For example, in some embodiments, the baseband circuitry 304 may include a third generation (3G) baseband processor 304A, a fourth generation (4G) baseband processor 304B, a fifth generation (5G) baseband processor 304C, or other baseband processor(s) 304D for other existing generations, generations in development or to be developed in the future (e.g., second generation (2G), sixth generation (6G), etc.). The baseband circuitry 304 (e.g., one or more of baseband processors 304A-D) may handle various radio control functions that enable communication with one or more radio networks via the RF circuitry 306.

In other embodiments, some or all of the functionality of baseband processors 304A-D may be included in modules stored in the memory 304G and executed via a Central Processing Unit (CPU) 304E. The radio control functions may include, but are not limited to, signal modulation/demodulation, encoding/decoding, radio frequency shifting, etc. In some embodiments, modulation/demodulation circuitry of the baseband circuitry 304 may include Fast-Fourier Transform (FFT), precoding, or constellation mapping/demapping functionality. In some embodiments, encoding/decoding circuitry of the baseband circuitry 304 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 304 may include one or more audio digital signal processor(s) (DSP) 304F. The audio DSP(s) 304F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 304 and the application circuitry 302 may be implemented together such as, for example, on a system on a chip (SOC).

In some embodiments, the baseband circuitry 304 may provide for communication compatible with one or more radio technologies. For example, in some embodiments, the baseband circuitry 304 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 304 is configured to support radio communications of more than one wireless protocol may be referred to as multi-mode baseband circuitry.

RF circuitry 306 may enable communication with wireless networks using modulated electromagnetic radiation through a non-solid medium. In various embodiments, the RF circuitry 306 may include switches, filters, amplifiers, etc. to facilitate the communication with the wireless network. RF circuitry 306 may include a receive signal path which may include circuitry to down-convert RF signals received from the FEM circuitry 308 and provide baseband signals to the baseband circuitry 304. RF circuitry 306 may also include a transmit signal path which may include circuitry to up-convert baseband signals provided by the baseband circuitry 304 and provide RF output signals to the FEM circuitry 308 for transmission.

In some embodiments, the receive signal path of the RF circuitry 306 may include mixer circuitry 306A, amplifier circuitry 306B and filter circuitry 306C. In some embodiments, the transmit signal path of the RF circuitry 306 may include filter circuitry 306C and mixer circuitry 306A. RF circuitry 306 may also include synthesizer circuitry 306D for synthesizing a frequency for use by the mixer circuitry 306A of the receive signal path and the transmit signal path. In some embodiments, the mixer circuitry 306A of the receive signal path may be configured to down-convert RF signals received from the FEM circuitry 308 based on the synthesized frequency provided by synthesizer circuitry 306D. The amplifier circuitry 306B may be configured to amplify the down-converted signals and the filter circuitry 306C may be a low-pass filter (LPF) or band-pass filter (BPF) configured to remove unwanted signals from the down-converted signals to generate output baseband signals. Output baseband signals may be provided to the baseband circuitry 304 for further processing. In some embodiments, the output baseband signals may be zero-frequency baseband signals, although this is not a requirement. In some embodiments, mixer circuitry 306A of the receive signal path may comprise passive mixers, although the scope of the embodiments is not limited in this respect.

In some embodiments, the mixer circuitry 306A of the transmit signal path may be configured to up-convert input baseband signals based on the synthesized frequency provided by the synthesizer circuitry 306D to generate RF output signals for the FEM circuitry 308. The baseband signals may be provided by the baseband circuitry 304 and may be filtered by filter circuitry 306C.

In some embodiments, the mixer circuitry 306A of the receive signal path and the mixer circuitry 306A of the transmit signal path may include two or more mixers and may be arranged for quadrature downconversion and upconversion, respectively. In some embodiments, the mixer circuitry 306A of the receive signal path and the mixer circuitry 306A of the transmit signal path may include two or more mixers and may be arranged for image rejection (e.g., Hartley image rejection). In some embodiments, the mixer circuitry 306A of the receive signal path and the mixer circuitry 306A may be arranged for direct downconversion and direct upconversion, respectively. In some embodiments, the mixer circuitry 306A of the receive signal path and the mixer circuitry 306A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 306 may include analog-to-digital converter (ADC) and digital-to-analog converter (DAC) circuitry and the baseband circuitry 304 may include a digital baseband interface to communicate with the RF circuitry 306.

In some dual-mode embodiments, a separate radio IC circuitry may be provided for processing signals for each spectrum, although the scope of the embodiments is not limited in this respect.

In some embodiments, the synthesizer circuitry 306D may be a fractional-N synthesizer or a fractional N/N+1 synthesizer, although the scope of the embodiments is not limited in this respect as other types of frequency synthesizers may be suitable. For example, synthesizer circuitry 306D may be a delta-sigma synthesizer, a frequency multiplier, or a synthesizer comprising a phase-locked loop with a frequency divider.

The synthesizer circuitry 306D may be configured to synthesize an output frequency for use by the mixer circuitry 306A of the RF circuitry 306 based on a frequency input and a divider control input. In some embodiments, the synthesizer circuitry 306D may be a fractional N/N+1 synthesizer.

In some embodiments, frequency input may be provided by a voltage controlled oscillator (VCO), although that is not a requirement. Divider control input may be provided by either the baseband circuitry 304 or the applications processor 302 depending on the desired output frequency. In some embodiments, a divider control input (e.g., N) may be determined from a look-up table based on a channel indicated by the applications processor 302.

Synthesizer circuitry 306D of the RF circuitry 306 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 306D may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 306 may include an IQ/polar converter.

FEM circuitry 308 may include a receive signal path which may include circuitry configured to operate on RF signals received from one or more antennas 310, amplify the received signals and provide the amplified versions of the received signals to the RF circuitry 306 for further processing. FEM circuitry 308 may also include a transmit signal path which may include circuitry configured to amplify signals for transmission provided by the RF circuitry 306 for transmission by one or more of the one or more antennas 310. In various embodiments, the amplification through the transmit or receive signal paths may be done solely in the RF circuitry 306, solely in the FEM 308, or in both the RF circuitry 306 and the FEM 308.

In some embodiments, the FEM circuitry 308 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 306). The transmit signal path of the FEM circuitry 308 may include a power amplifier (PA) to amplify input RF signals (e.g., provided by RF circuitry 306), and one or more filters to generate RF signals for subsequent transmission (e.g., by one or more of the one or more antennas 310).

In some embodiments, the PMC 312 may manage power provided to the baseband circuitry 304. In particular, the PMC 312 may control power-source selection, voltage scaling, battery charging, or DC-to-DC conversion. The PMC 312 may often be included when the device 300 is capable of being powered by a battery, for example, when the device is included in a UE. The PMC 312 may increase the power conversion efficiency while providing desirable implementation size and heat dissipation characteristics.

While FIG. 3 shows the PMC 312 coupled only with the baseband circuitry 304. However, in other embodiments, the PMC 312 may be additionally or alternatively coupled with, and perform similar power management operations for, other components such as, but not limited to, application circuitry 302, RF circuitry 306, or FEM 308.

In some embodiments, the PMC 312 may control, or otherwise be part of, various power saving mechanisms of the device 300. For example, if the device 300 is in an RRC_Connected state, where it is still connected to the RAN node as it expects to receive traffic shortly, then it may enter a state known as Discontinuous Reception Mode (DRX) after a period of inactivity. During this state, the device 300 may power down for brief intervals of time and thus save power.

If there is no data traffic activity for an extended period of time, then the device 300 may transition off to an RRC_Idle state, where it disconnects from the network and does not perform operations such as channel quality feedback, handover, etc. The device 300 goes into a very low power state and it performs paging where again it periodically wakes up to listen to the network and then powers down again. The device 300 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Figure 6:
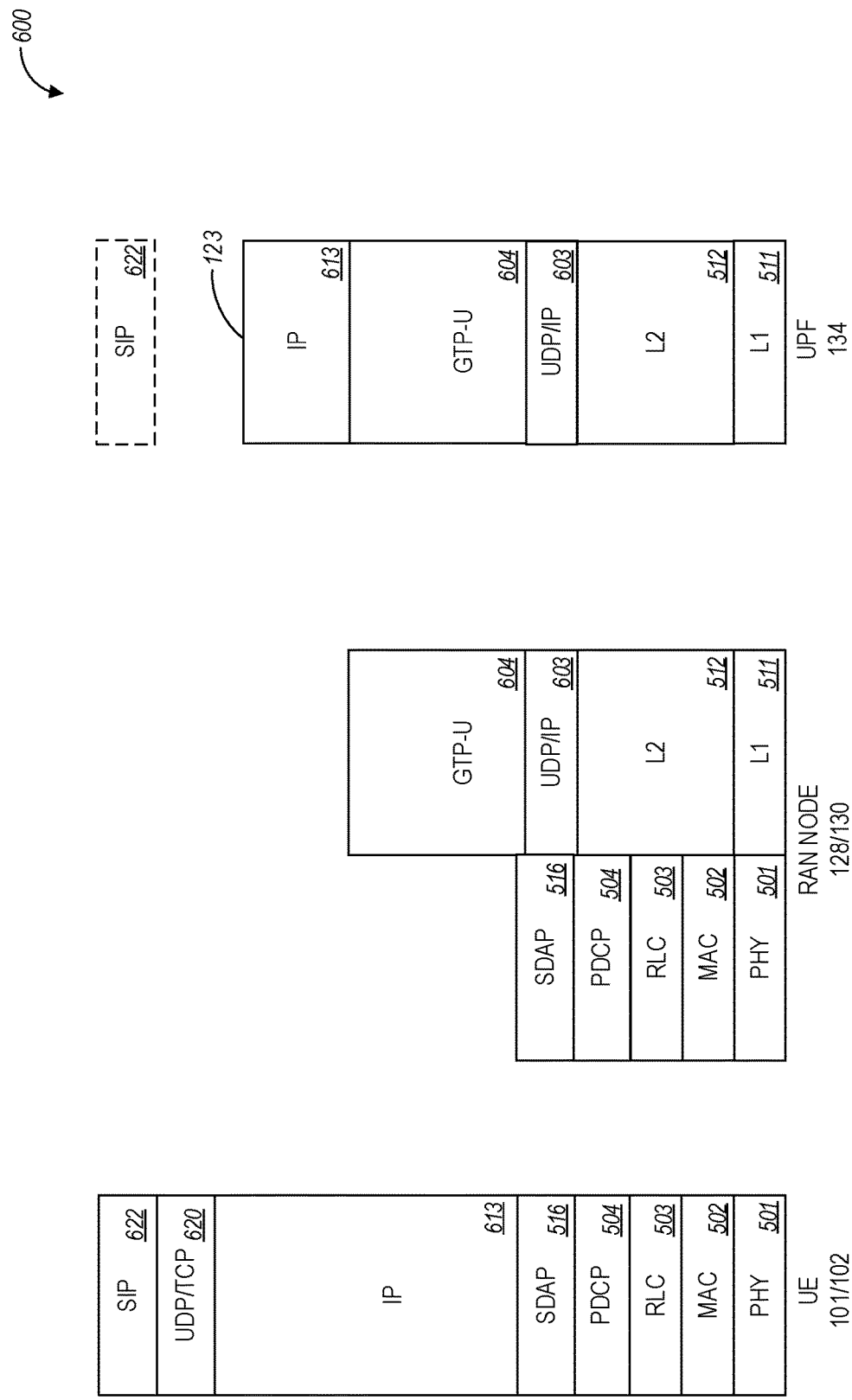
FIG. 6 is an illustration of a user plane protocol stack in accordance with some embodiments.

Processors of the application circuitry 302 and processors of the baseband circuitry 304 may be used to execute elements of one or more instances of a protocol stack (e.g., protocol stack described with respect to FIG. 2, FIG. 5, and/or FIG. 6). For example, processors of the baseband circuitry 304, alone or in combination, may be used execute Layer 3, Layer 2, or Layer 1 functionality, while processors of the application circuitry 304 may utilize data (e.g., packet data) received from these layers and further execute Layer 4 functionality (e.g., transmission communication protocol (TCP) and user datagram protocol (UDP) layers). As referred to herein, Layer 3 may comprise a RRC layer (e.g., 255, 505). As referred to herein, Layer 2 may comprise a MAC layer (e.g., 220, 502), a RLC layer (e.g., 230, 503), and a PDCP layer (e.g., 240, 504). As referred to herein, Layer 1 may comprise a PHY layer (e.g., 210, 501) of a UE/RAN node.

Figure 4:
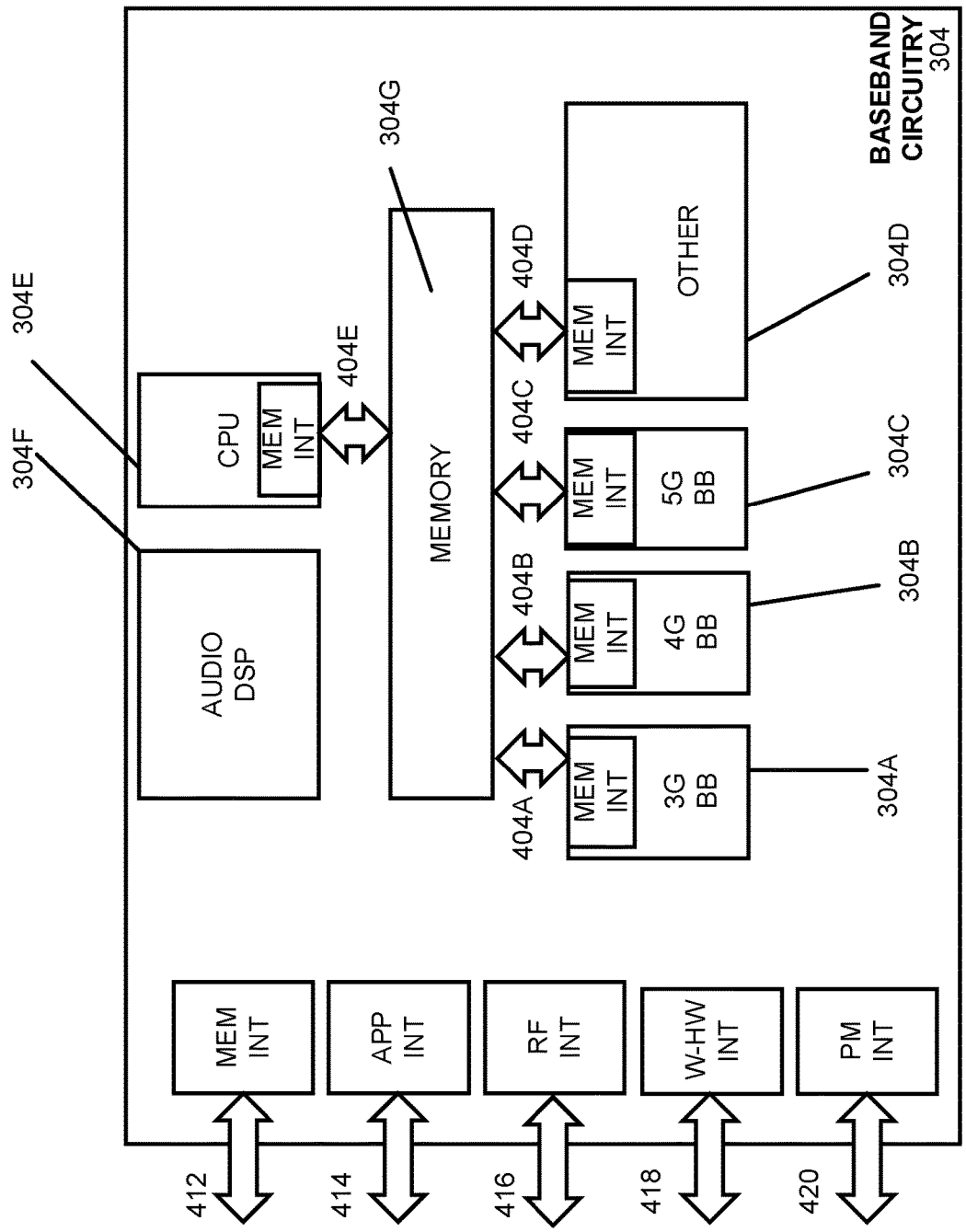
FIG. 4 illustrates example interfaces of baseband circuitry in accordance with some embodiments.

FIG. 4 illustrates example interfaces of baseband circuitry in accordance with some embodiments. As discussed above, the baseband circuitry 304 of FIG. 3 may comprise processors 304A-304E and a memory 304G utilized by said processors. Each of the processors 304A-304E may include a memory interface, 404A-404E, respectively, to send/receive data to/from the memory 304G.

The baseband circuitry 304 may further include one or more interfaces to communicatively couple to other circuitries/devices, such as a memory interface 412 (e.g., an interface to send/receive data to/from memory external to the baseband circuitry 304), an application circuitry interface 414 (e.g., an interface to send/receive data to/from the application circuitry 302 of FIG. 3), an RF circuitry interface 416 (e.g., an interface to send/receive data to/from RF circuitry 306 of FIG. 3), a wireless hardware connectivity interface 418 (e.g., an interface to send/receive data to/from Near Field Communication (NFC) components, Bluetooth® components (e.g., Bluetooth® Low Energy), Wi-Fi® components, and other communication components), and a power management interface 420 (e.g., an interface to send/receive power or control signals to/from the PMC 312).

FIG. 5 is an illustration of a control plane protocol stack in accordance with some embodiments. In one embodiment, a control plane 500 is shown as a communications protocol stack between the UE 102, the RAN node 128 (or alternatively, the RAN node 130), and the AMF 132.

The PHY layer 501 may in some embodiments transmit or receive information used by the MAC layer 502 over one or more air interfaces. The PHY layer 501 may further perform link adaptation or adaptive modulation and coding (AMC), power control, cell search (e.g., for initial synchronization and handover purposes), and other measurements used by higher layers, such as the RRC layer 505. The PHY layer 501 may in some embodiments still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 502 may in some embodiments perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARD), and logical channel prioritization.

The RLC layer 503 may in some embodiments operate in a plurality of modes of operation, including: Transparent Mode (TM), Unacknowledged Mode (UM), and Acknowledged Mode (AM). The RLC layer 503 may execute transfer of upper layer protocol data units (PDUs), error correction through automatic repeat request (ARQ) for AM data transfers, and segmentation and reassembly of RLC SDUs for UM and AM data transfers. The RLC layer 503 may also maintain sequence numbers independent of the ones in PDCP for UM and AM data transfers. The RLC layer 503 may also in some embodiments execute re-segmentation of RLC data PDUs for AM data transfers, detect duplicate data for AM data transfers, discard RLC SDUs for UM and AM data transfers, detect protocol errors for AM data transfers, and perform RLC re-establishment.

The PDCP layer 504 may in some embodiments execute header compression and decompression of IP data, maintain PDCP Sequence Numbers (SNs), perform in-sequence delivery of upper layer PDUs at re-establishment of lower layers, perform reordering and eliminate duplicates of lower layer SDUs, execute PDCP PDU routing for the case of split bearers, execute retransmission of lower layer SDUs, cipher and decipher control plane and user plane data, perform integrity protection and integrity verification of control plane and user plane data, control timer-based discard of data, and perform security operations (e.g., ciphering, deciphering, integrity protection, integrity verification, etc.).

In some embodiments, primary services and functions of the RRC layer 505 may include broadcast of system information (e.g., included in Master Information Blocks (MIBs) or System Information Blocks (SIBs) related to the non-access stratum (NAS)); broadcast of system information related to the access stratum (AS); paging initiated by 5GC 120 or NG-RAN 110, establishment, maintenance, and release of an RRC connection between the UE and NG-RAN (e.g., RRC connection paging, RRC connection establishment, RRC connection addition, RRC connection modification, and RRC connection release, also for carrier aggregation (CA) and Dual Connectivity (DC) in NR or between E-UTRA and NR); establishment, configuration, maintenance, and release of Signalling Radio Bearers (SRBs) and Data Radio Bearers (DRBs); security functions including key management, mobility functions including handover and context transfer, UE cell selection and reselection and control of cell selection and reselection, and inter-radio access technology (RAT) mobility; and measurement configuration for UE measurement reporting. The MIBs and SIBs may comprise one or more information elements (IEs), which may each comprise individual data fields or data structures. The RRC layer 505 may also, in some embodiments, execute QoS management functions, detection of and recovery from radio link failure, and NAS message transfer between the NAS 506 in the UE and the NAS 506 in the AMF 132.

In some embodiments, the following NAS messages can be communicated during the corresponding NAS procedure, as illustrated in Table 1 below:

TABLE 1

| 5G NAS Message | 5G NAS Procedure | 4G NAS Message name | 4G NAS Procedure |
|---|---|---|---|
| Registration Request | Initial registration procedure | Attach Request | Attach procedure |
| Registration Request | Mobility registration update procedure | Tracking Area Update (TAU) Request | Tracking area updating procedure |
| Registration Request | Periodic registration update procedure | TAU Request | Periodic tracking area updating procedure |

TABLE 1-continued

| 5G NAS Message | 5G NAS Procedure | 4G NAS Message name | 4G NAS Procedure |
|---|---|---|---|
| Deregistration Request | Deregistration procedure | Detach Request | Detach procedure |
| Service Request | Service request procedure | Service Request or Extended Service Request | Service request procedure |
| PDU Session Establishment Request | PDU session establishment procedure | PDN Connectivity Request | PDN connectivity procedure |

In some embodiments, when the same message is used for more than one procedure, then a parameter can be used (e.g., registration type or TAU type) which indicates the specific purpose of the procedure, e.g. registration type="initial registration", "mobility registration update" or "periodic registration update".

The UE 101 and the RAN node 128/130 may utilize an NG radio interface (e.g., an LTE-Uu interface or an NR radio interface) to exchange control plane data via a protocol stack comprising the PHY layer 501, the MAC layer 502, the RLC layer 503, the PDCP layer 504, and the RRC layer 505.

The non-access stratum (NAS) protocols 506 form the highest stratum of the control plane between the UE 101 and the AMF 132 as illustrated in FIG. 5. In embodiments, the NAS protocols 506 support the mobility of the UE 101 and the session management procedures to establish and maintain IP connectivity between the UE 101 and the UPF 134. In some embodiments, the UE protocol stack can include one or more upper layers, above the NAS layer 506. For example, the upper layers can include an operating system layer 524, a connection manager 520, and application layer 522. In some embodiments, the application layer 522 can include one or more clients which can be used to perform various application functionalities, including providing an interface for and communicating with one or more outside networks. In some embodiments, the application layer 522 can include an IP multimedia subsystem (IMS) client 526.

The NG Application Protocol (NG-AP) layer 515 may support the functions of the N2 and N3 interface and comprise Elementary Procedures (EPs). An EP is a unit of interaction between the RAN node 128/130 and the 5GC 120. In certain embodiments, the NG-AP layer 515 services may comprise two groups: UE-associated services and non UE-associated services. These services perform functions including, but not limited to: UE context management, PDU session management and management of corresponding NG-RAN resources (e.g. Data Radio Bearers (DRBs)), UE capability indication, mobility, NAS signaling transport, and configuration transfer (e.g. for the transfer of Self-Organizing Network (SON) information).

The Stream Control Transmission Protocol (SCTP) layer (which may alternatively be referred to as the SCTP/IP layer) 514 may ensure reliable delivery of signaling messages between the RAN node 128/130 and the AMF 132 based, in part, on the IP protocol, supported by the IP layer 513. The L2 layer 512 and the L1 layer 511 may refer to communication links (e.g., wired or wireless) used by the RAN node 128/130 and the AMF 132 to exchange information. The RAN node 128/130 and the AMF 132 may utilize an N2 interface to exchange control plane data via a protocol stack comprising the L1 layer 511, the L2 layer 512, the IP layer 513, the SCTP layer 514, and the S1-AP layer 515.

FIG. 6 is an illustration of a user plane protocol stack in accordance with some embodiments. In this embodiment, a user plane 600 is shown as a communications protocol stack between the UE 102, the RAN node 128 (or alternatively, the RAN node 130), and the UPF 134. The user plane 600 may utilize at least some of the same protocol layers as the control plane 500. For example, the UE 102 and the RAN node 128 may utilize an NR radio interface to exchange user plane data via a protocol stack comprising the PHY layer 501, the MAC layer 502, the RLC layer 503, the PDCP layer 504, and the Service Data Adaptation Protocol (SDAP) layer 516. The SDAP layer 516 may, in some embodiments, execute a mapping between a Quality of Service (QoS) flow and a data radio bearer (DRB) and a marking of both DL and UL packets with a QoS flow ID (QFI). In some embodiments, an IP protocol stack 613 can be located above the SDAP 516. A user datagram protocol (UDP)/transmission control protocol (TCP) stack 620 can be located above the IP stack 613. A session initiation protocol (SIP) stack 622 can be located above the UDP/TCP stack 620, and can be used by the UE 102 and the UPF 134.

The General Packet Radio Service (GPRS) Tunneling Protocol for the user plane (GTP-U) layer 604 may be used for carrying user data within the 5G core network 120 and between the radio access network 110 and the 5G core network 120. The user data transported can be packets in IPv4, IPv6, or PPP formats, for example. The UDP and IP security (UDP/IP) layer 603 may provide checksums for data integrity, port numbers for addressing different functions at the source and destination, and encryption and authentication on the selected data flows. The RAN node 128/130 and the UPF 134 may utilize an N3 interface to exchange user plane data via a protocol stack comprising the L1 layer 411, the L2 layer 412, the UDP/IP layer 603, and the GTP-U layer 604. As discussed above with respect to FIG. 4, NAS protocols support the mobility of the UE 101 and the session management procedures to establish and maintain IP connectivity between the UE 101 and the UPF 134.

Figure 7:
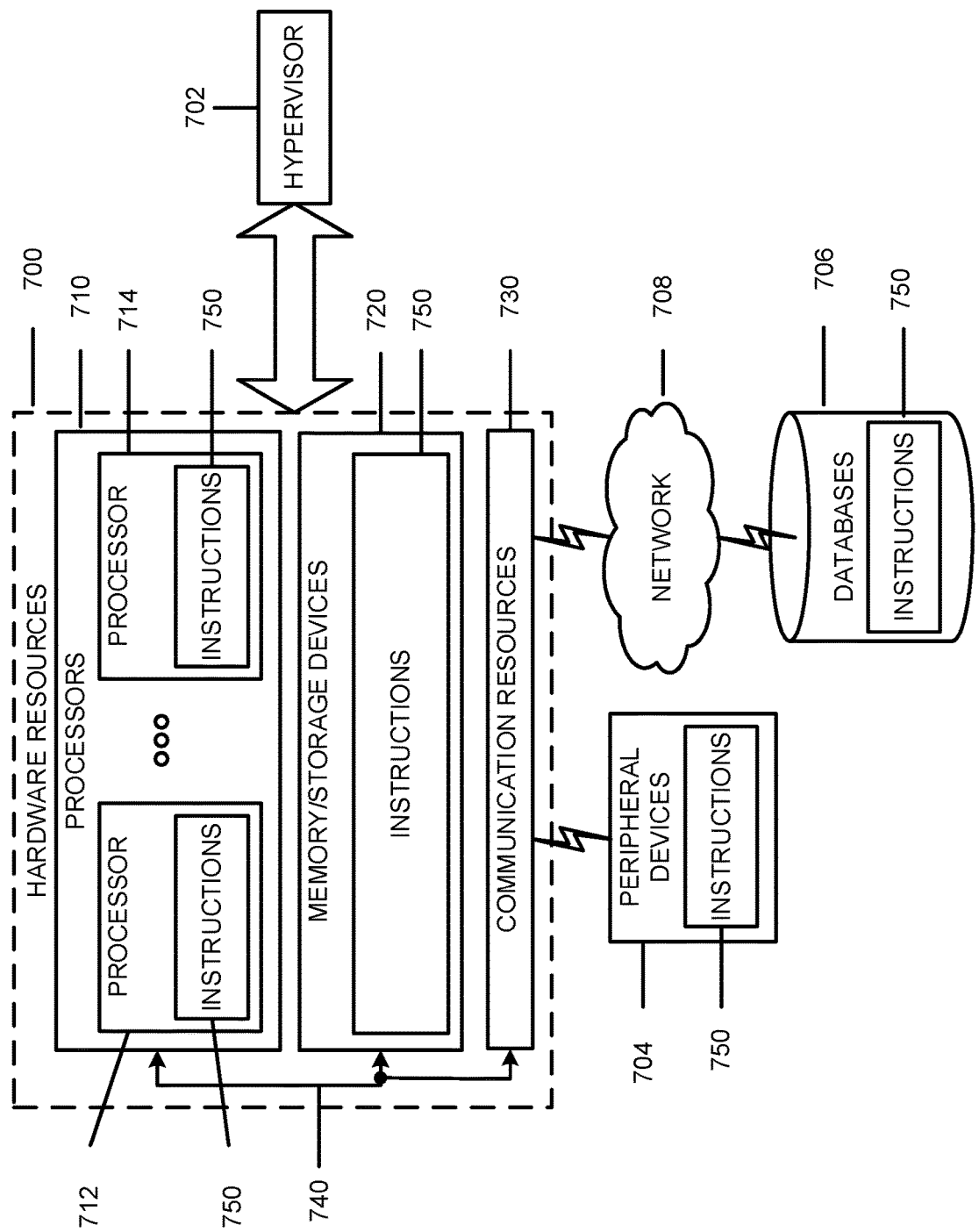
FIG. 7 is a block diagram illustrating components, according to some example embodiments, able to read instructions from a machine-readable or computer-readable medium (e.g., a non-transitory machine-readable storage medium) and perform any one or more of the methodologies discussed herein.

FIG. 7 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 7 shows a diagrammatic representation of hardware resources 700 including one or more processors (or processor cores) 710, one or more memory/storage devices 720, and one or more communication resources 730, each of which may be communicatively coupled via a bus 740. For embodiments in which node virtualization (e.g., NFV) is utilized, a hypervisor 702 may be executed to provide an execution environment for one or more network slices and/or sub-slices to utilize the hardware resources 700

The processors 710 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 712 and a processor 714.

The memory/storage devices 720 may include main memory, disk storage, or any suitable combination thereof. The memory/storage devices 720 may include, but are not limited to, any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 730 may include interconnection or network interface components or other suitable devices to communicate with one or more peripheral devices 704 or one or more databases 706 via a network 708. For example, the communication resources 730 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 750 may comprise software, a program, an application, an applet, an app, or other executable code for causing at least any of the processors 710 to perform any one or more of the methodologies discussed herein. The instructions 750 may reside, completely or partially, within at least one of the processors 710 (e.g., within the processor's cache memory), the memory/storage devices 720, or any suitable combination thereof. Furthermore, any portion of the instructions 750 may be transferred to the hardware resources 700 from any combination of the peripheral devices 704 or the databases 706. Accordingly, the memory of processors 710, the memory/storage devices 720, the peripheral devices 704, and the databases 706 are examples of computer-readable and machine-readable media.

Figure 8:
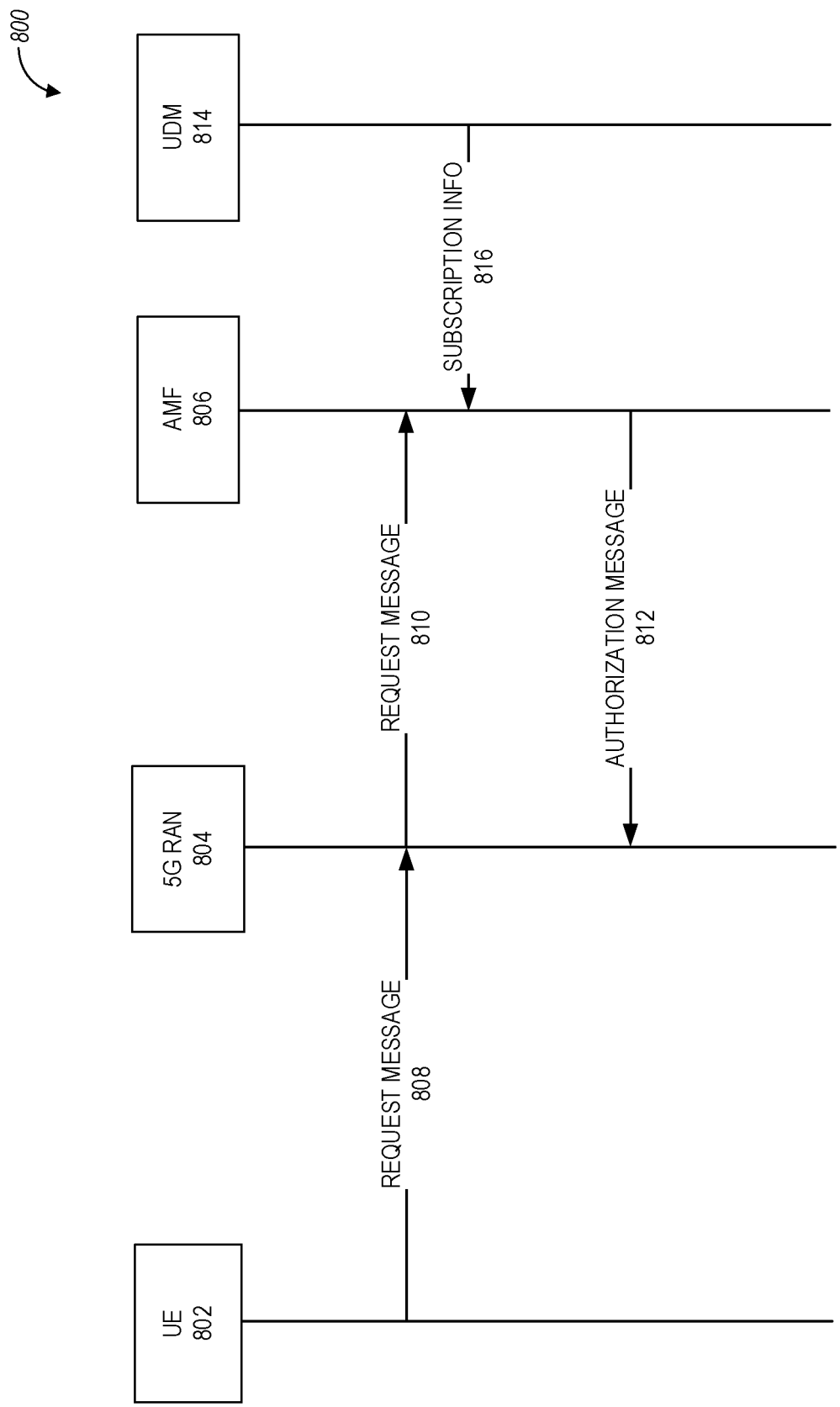
FIG. 8 illustrates a flow of a V2X operation, in accordance with some embodiments.

FIG. 8 illustrates a flow of a V2X operation, in accordance with some embodiments. In some embodiments, the V2X operation may be a V2X authorization operation 800 implemented in one of the network systems 100A or 100B, and may include operations performed by network entities (e.g., apparatuses in network entities) and UEs (e.g., vehicle UE) of the network systems 100A or 100B. For example, the flow of FIG. 8 can include signaling and/or messages transmitted between one or more of UE 101, 102, 802, a base station (e.g., 111, 112, 128A/128B, 130A/130B) such as a 5G RAN 804, and a network entity (e.g., AMF 134, AMF 806, MME 121, UDM 814, HSS 124). In some embodiments, UE 802 may the same or similar to UE 101 or 102, the 5G RAN 804 may be the same or similar to RAN 111, 112, 128, or 130, the AMF 806 may be the same or similar to AMF 132, and the UPF 814 may be the same or similar to UPF 134. In certain embodiments, the operations performed by AMF 806 may also be performed by a MME, such as MME 121, and the operations performed by UPF 814 may be performed by a HSS (e.g., HSS 124).

In some embodiments, UE 802, 5G RAN 804, AMF 806, and UDM 814 may be configured to operate within one of a standalone 5G network or a combined 4G network and 5G network (e.g., network 100A and network 100B combined). In such cases of a standalone 5G network, the 5G RAN 804 may be a master RAN node configured to use a 5G Core Network (e.g., 5GC 120). In such cases of a combined 4G and 5G network, the 5G RAN 804 may be a master RAN node configured to use the 5GC, or the 5G RAN 804 may be a secondary RAN node configured to use an Evolved Packet Core (e.g., CN 120). The 5G RAN 804 of the combined 4G and 5G network scenario may be a ng-eNB or a gNB, both of which may be configured as a master or a secondary node.

In some embodiments, a UE 802 may encode V2X information for a V2X operation (e.g., within signaling for transmission by the UE's transceiver circuitry) within signaling and/or messages to a network entity (e.g., 5G RAN 804, AMF/MME 806). The V2X information can be used for a V2X authorization operation (e.g., as part of a registration, attach, service request, and/or registration update procedure) and the V2X information can be information included in an IE within a message, for example, any one of an Access Stratum (AS) message, a Non-Access Stratum (NAS) message, a tracking area update (TAU) request message, a registration request message, or a service request message. In some embodiments, the registration request message can initiate an initial registration with the network (e.g., standalone 5G system or combined 5G/4G system) or initiate a registration update with the network (e.g., TAU). For example, when a UE moves from one core network to another core network (e.g., EPC to 5GC), the UE may perform part of a registration procedure that includes transmitting the registration request message to a network entity. In some aspects, when a UE moves from one core network to another core network (e.g., 5GC to EPC), the UE may perform part of a TAU procedure and/or an attach procedure that includes transmitting a TAU request message and/or a registration request message to a network entity.

The service request message can initiate an establishment of a secure connection to the 5G or 5G/4G combined system (e.g., AMF, MME). For example, the UE can initiate a service request procedure by transmitting a service request message, to establish a communication link for the UE to transmit uplink signaling messages and/or user data.

In certain embodiments, such V2X information can include V2X capability information (e.g., a V2X capability indication) in a message to indicate to a network entity a capability of the UE 802 for V2X communications over an reference point, such as a PC5 reference point. The PC5 reference point is the reference point between UEs that are configured for device-to-device communications (e.g., configured for Proximity Services, D2D discovery and communications). In some embodiments, the UE 802 can include V2X information (e.g., V2X capability) in a message (e.g., request message 808) and/or signaling for a procedure including any one of an initial registration procedure and/or attach procedure, a service request procedure, a TAU procedure, a Xn based handover procedure, or a S1 based handover procedure.

In addition to indicating the capability of the UE 802 for V2X communication over a PC5 reference point, the V2X information can also include an indication of a RAT for communication over the PC5 reference point, such as a E-UTRA RAT or a NR/5G RAT. The UE 802 can then configure its transceiver circuitry (e.g., 306, 308, and 310 of FIG. 3) to transmit the request message 808 to the network entity, such as the 5G RAN 804. In some embodiments, the 5G RAN 804 receives signaling from the UE 802, including the request message 808, and decodes the V2X information and any other relevant information, from the request message 808. In certain embodiments, a message from the UE 802 to the 5G RAN 804 can comprise a NAS message.

The 5G RAN 804 can then transmit a request message 810 to a network entity (e.g., AMF 806, MME), including the V2X information, which the network entity (e.g., AMF 806) may use to determine authorization of the UE 802 for V2X communication and authorization of the UE to use the RAT (e.g., over the PC5 reference point for V2X communication). The request message 810 may include similar or the same information as the request message 808. In some embodiments, the request message 810 can include V2X capability information and RAT information. In some embodiments, the AMF 806 receives and stores V2X information associated with the UE 802. From the received V2X information, the AMF 806 can make a determination of whether the UE 802 is authorized to use V2X communication over the PC5 reference point and/or whether the UE is authorized to use the RAT over the PC5 reference point for the V2X communication, based on certain information, for example, subscription information. The AMF 806 can obtain subscription information associated with the UE 802, in some embodiments, from signaling and/or a message (e.g., subscription information 816) from another network entity, such as the UDM 814 or a Home Subscriber Server (HSS).

Following a determination of whether the UE 802 is authorized for V2X communications according to a RAT, based on the subscription information or other information, the AMF 806 (e.g., or MME) can encode and transmit an authorization message 812 to the 5G RAN 804 to indicate whether the UE 802 is authorized for V2X communications over the PC5 reference point. The authorization message 812 can include information such as a V2X services authorization indication, to indicate whether the UE is authorized to use V2X communication over the PC5 reference point, an indication of RAT information (e.g., E-UTRA RAT, NR RAT), and a UE PC5 Aggregate Maximum Bit Rate (UE-PC5-AMBR) indication. In some embodiments, the authorization message 812 may be a N2 message or a S1 (e.g., S1-AP) message. The determination of whether the UE 802 is authorized for V2X communications according to a RAT may be determined, in part, according to the V2X capability indication that is included in the request message 808 from the UE 802.

In some embodiments, the V2X information (e.g., V2X capability) may be used in a handover procedure, for example, in an Xn-based handover procedure, an S1-based handover, or a N2-based handover procedure. For example, in some embodiments, a source base station (e.g., 5G RAN 804) may be configured to include V2X information in a handover request message for transmission to a target base station (e.g., a target 5G RAN), and may transmit the V2X information to the target 5G RAN in the handover request message. In certain embodiments, the 5G RAN 804 may have determined that the UE 802 is authorized to use V2X communication over the PC5 reference point based on the authorization message 812 received from the AMF 806. Based on a determination of authorization for V2X communications by the UE 802, the 5G RAN 804 may encode signaling and/or a message for transmission to the target 5G RAN to include any one or more of the V2X services authorized indication, the indication of the RAT (e.g., E-UTRA RAT, NR RAT), and the UE-PC5-AMBR indication. In certain embodiments, the V2X services authorized indication may be included in a UE context, associated with the UE 802.

As part of a handover procedure, in some embodiments, the AMF 806 (e.g., or MME) may use the V2X information (e.g., V2X capability). For example, the AMF 806 may be configured for a Xn-based handover procedure and may encode (e.g., for transmission to a target base station, 5G RAN, eNB) a message and/or signaling (e.g., a N2 Path Switch Request Acknowledge message) that includes the V2X services authorized indication. In some embodiments, the message may also include an indication of RAT information (e.g., an indication of the authorized RAT), and the UE-PC5-AMBR indication.

In another example, the AMF 806 may be configured for a N2-based handover procedure and may encode (e.g., for transmission to a target base station, 5G RAN, eNB) a message and/or signaling (e.g., a N2-AP handover request message) that includes the V2X services authorized indication, the indication of the RAT information (e.g., indication of the authorized RAT), and the UE-PC5-AMBR indication. In other embodiments, as part of an Xn-based handover procedure, an MME may encode (e.g., for transmission to a target base station, 5G RAN, eNB) a message and/or signaling (e.g., a Path Switch Request Acknowledge message) that includes the V2X services authorized indication and the UE-PC5-AMBR indication.

In certain embodiments, a change in subscription information associated with the UE 802 may take place. In such embodiments, an updated to the V2X information may be appropriate. For example, a network entity (e.g., AMF 806, MME) may determine that a change in subscription information has occurred. This may be detected based on a notification from one of a UDM or a HSS. In such case, the network entity can encode (e.g., for transmission to a target base station, 5G RAN, eNB) a message and/or signaling to include an update of information. For example, the AMF 806 can encode and transmit to the target 5G RAN a N2-AP UE Context Modification Request message, that may include any one or more of an updated V2X services authorized indication, an updated indication of the authorized RAT, or an updated UE-PC5-AMBR indication. In other embodiments, the network entity can encode a S1-AP UE Context Modification Request message that may include any one or more of an updated V2X services authorized indication, an updated indication of the authorized RAT, or an updated UE-PC5-AMBR indication.

Figure 9:
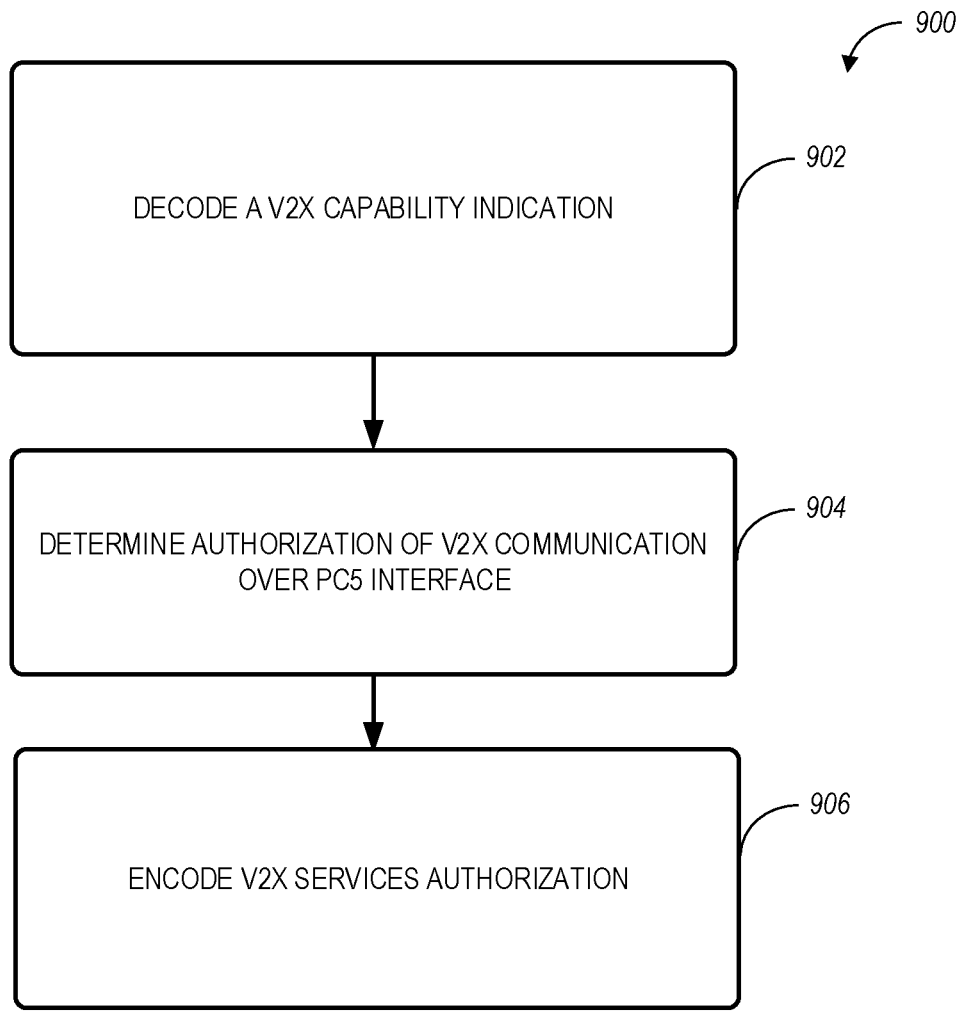
FIG. 9 illustrates generally a flow of example functionalities which can be performed in a wireless architecture in connection with V2X authorization, in accordance with some embodiments.

FIG. 9 illustrates generally a flowchart of example functionalities which can be performed in a wireless architecture in connection with V2X authorization, in accordance with some embodiments. Referring to FIG. 9, the example method 900 can start at operation 902, when signaling and/or a message including a V2X capability indication can be decoded. For example, a network entity (e.g., AMF 806, MME) can receive a request message 810 including a V2X capability indication.

In some embodiments, the request message 810, including the V2X capability indication, may be a message similar to a request message 808 encoded by a UE (e.g., UE 802) and transmitted to a base station, such as the 5G RAN 804, to indicate a capability of the UE 802 for V2X communications over a PC5 reference point. The 5G RAN 804 may transmit the V2X capability indication to the AMF 806 in signaling and/or the request message 810.

At operation 904, the network entity (e.g., AMF 806, MME) can determine, based on the received V2X capability indication, and any other relevant information, whether the UE 802 is capable of V2X communications over the PC5 reference point, as well as whether the UE 802 is authorized for the V2X communications over the PC5 reference point. In some embodiments of the method 900, the AMF 806 may obtain information from another network entity, such as the UDM 814 (or HSS), to use in determining whether the UE 802 is authorized for the V2X communication. In certain embodiments, the information may be received by the AMF 806 in signaling and/or a message from the UDM 814, and may include subscription information 816.

At operation 906, the network entity (e.g., AMF 806, MME) can encode a V2X services authorization for transmission in a message to the 5G RAN 804 to indicate whether the UE 802 is authorized for the V2X communications over the PC5 reference point. In some embodiments, the request message 808, or 810 may be any of a Non-Access Stratum (NAS) message, a tracking area update (TAU) request message, a registration request message, or a service request message. In some embodiments, when the request message 808 transmitted from a UE is a registration request message, the network entity can be configured to transmit a registration accept message to the UE to indicate an acceptance of the registration request message (e.g., registration with the 5GS, combined 5GS/4GS).

Any of the operations 902-906 may be performed by any of the UEs and/or network entities illustrated in the networks 100A and/or 100B shown in FIGS. 1A and 1B. For example, the UE 802, 5G RAN 804, the AMF 806 (or MME), and UDM 814 (or HSS) may receive or transmit signaling as described in the method 900, and as described with respect to FIG. 8, as part of any one or more of an initial registration procedure, an attach procedure, a service request procedure, a tracking area update (TAU) procedure, a Xn based handover procedure, or a S1 based handover procedure.

Figure 10:
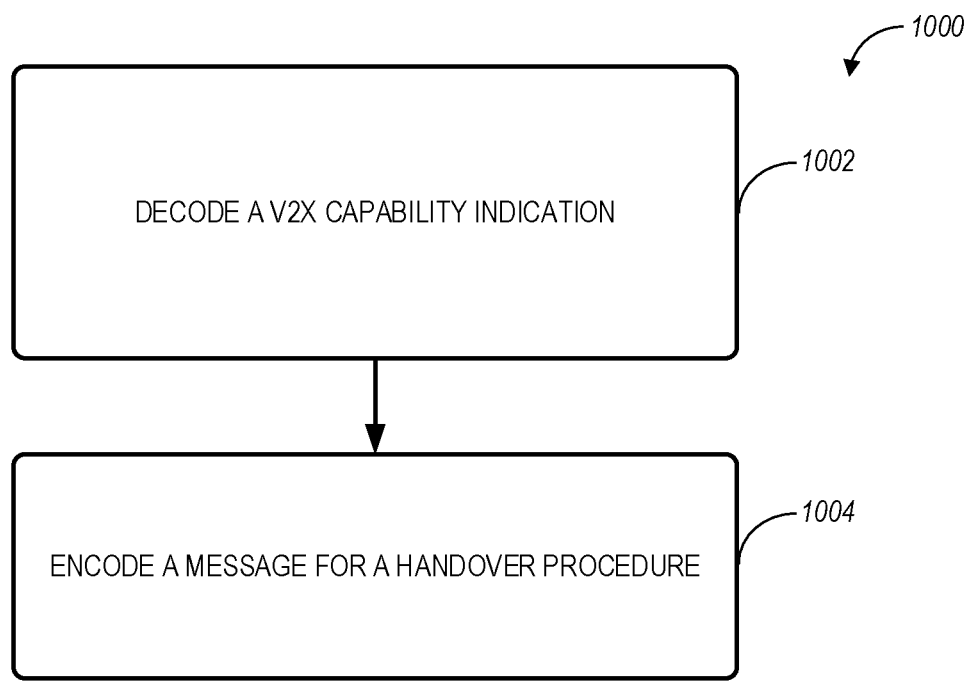
FIG. 10 illustrates generally a flow of example functionalities which can be performed in a wireless architecture in connection with V2X authorization, in accordance with some embodiments.

FIG. 10 illustrates generally a flowchart of example functionalities which can be performed in a wireless architecture in connection with V2X authorization, in accordance with some embodiments. Referring to FIG. 10, the example method 1000 can start at operation 1002, when signaling and/or a message including a V2X capability indication can be decoded. For example, a network entity (e.g., AMF 806, MME) can receive a request message 810 including a V2X capability indication. At operation 1004, the AMF 806 (or MME) may encode a message and/or signaling for a handover procedure. The handover procedure may include a Xn based handover procedure, for example, in which the AMF 806 may encode an N2 Path Switch Request Acknowledge message for transmission to a target base station (e.g., 5G RAN 804). In some embodiments, the AMF 806 may encode the N2 Path Switch Request Acknowledge message to include any one or more of a V2X services authorized indication, an indication of the authorized RAT (e.g., E-UTRA RAT or a 5G RAN RAT), or a UE-PC5-AMBR indication.

In some embodiments, the handover procedure may include a N2 based handover procedure, for example, in which the AMF 806 may encode an N2-AP handover request message for transmission to a target base station (e.g., 5G RAN 804). In some embodiments, the AMF 806 may encode the N2-AP handover request message to include any one or more of the V2X services authorized indication, the indication of the authorized RAT (e.g., E-UTRA RAT or a 5G RAN RAT), or the UE-PC5-AMBR indication. In other embodiments, the network entity of operation 1004 may be a MME (e.g., MME 121) and the MME 121 may be configured to encode, as part of a Xn-based handover procedure, a Path Switch Request Acknowledge message for transmission to a target base station (e.g., 5G RAN 804, eNB). In some embodiments, the MME 121 may encode the Path Switch Request Acknowledge message to include any one or more of a V2X services authorized indication, an indication of the authorized RAT (e.g., E-UTRA RAT or a 5G RAN RAT), or a UE-PC5-AMBR indication.

In other embodiments, the method 1000 may be performed by a base station (e.g., 5G RAN 804) as part of a handover procedure (e.g., Xn-based handover procedure). For example, at operation 1002, the 5G RAN 804 may decode the V2X capability indication from a message received from a UE (e.g., UE 802). As part of the Xn-based handover procedure, the 5G RAN 804 may encode a handover request message for transmission to a target base station (e.g., a target 5G RAN). In some embodiments, the 5G RAN 804 may have received a V2X services authorized indication, from another network entity (e.g., AMF 806, MME), indicating whether the UE is authorized to use V2X communication over a PC5 reference point. The handover request message may include any one or more of the V2X services authorized indication, an indication of an authorized RAT, and a UE PC5 Aggregate Maximum Bit Rate (UE-PC5-AMBR) indication.

Figure 11:
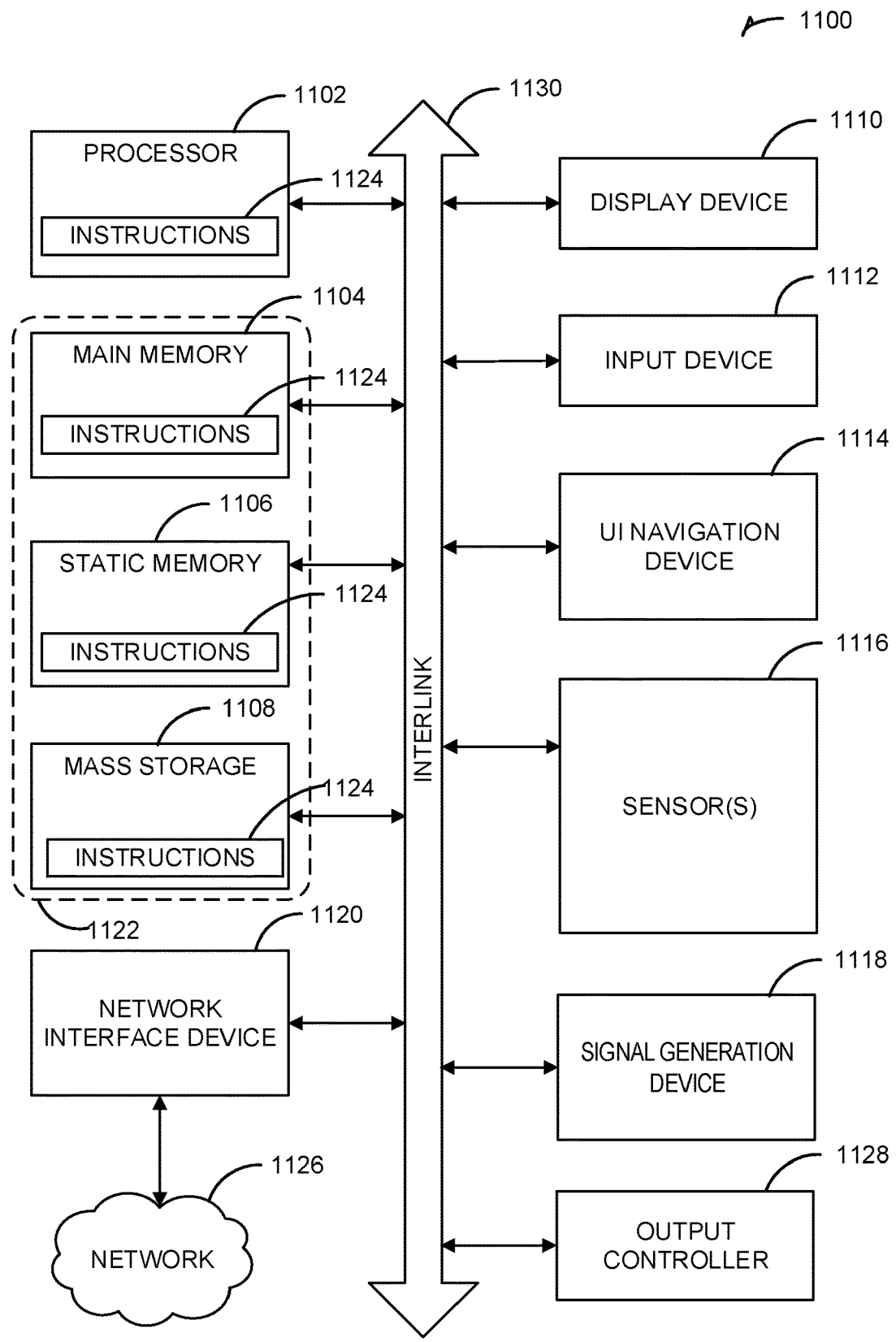
FIG. 11 illustrates a block diagram of an example machine, in accordance with some embodiments.

FIG. 11 illustrates a block diagram of an example machine 1100 upon which any one or more of the techniques (e.g., methodologies) discussed herein may be performed, for example, one or more efeMTC operations. Examples, as described herein, may include, or may operate by, logic or a number of components, or mechanisms in the machine 1100. Circuitry (e.g., processing circuitry) is a collection of circuits implemented in tangible entities of the machine 1100 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 1100 follow.

In alternative embodiments, the machine 1100 may operate as a standalone device or may be connected (e.g., networked) to other machines. In a networked deployment, the machine 1100 may operate in the capacity of a server machine, a client machine, or both in server-client network environments. In an example, the machine 1100 may act as a peer machine in peer-to-peer (P2P) (or other distributed) network environment. The machine 1100 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 1100 may include a hardware processor 1102 (e.g., a central processing unit (CPU), a graphics processing unit (GPU), a hardware processor core, or any combination thereof), a main memory 1104, a static memory (e.g., memory or storage for firmware, microcode, a basic-input-output (BIOS), unified extensible firmware interface (UEFI), etc.) 1106, and mass storage 1108 (e.g., hard drive, tape drive, flash storage, or other block devices) some or all of which may communicate with each other via an interlink (e.g., bus) 1130. The machine 1100 may further include a display unit 1110, an alphanumeric input device 1112 (e.g., a keyboard), and a user interface (UI) navigation device 1114 (e.g., a mouse). In an example, the display unit 1110, input device 1112 and UI navigation device 1114 may be a touch screen display. The machine 1100 may additionally include a storage device (e.g., drive unit) 1108, a signal generation device 1118 (e.g., a speaker), a network interface device 1120, and one or more sensors 1116, such as a global positioning system (GPS) sensor, compass, accelerometer, or other sensor. The machine 1100 may include an output controller 1128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 1102, the main memory 1104, the static memory 1106, or the mass storage 1108 may be, or include, a machine readable medium 1122 on which is stored one or more sets of data structures or instructions 1124 (e.g., software) embodying or utilized by any one or more of the techniques or functions described herein. The instructions 1124 may also reside, completely or at least partially, within any of registers of the processor 1102, the main memory 1104, the static memory 1106, or the mass storage 1108 during execution thereof by the machine 1100. In an example, one or any combination of the hardware processor 1102, the main memory 1104, the static memory 1106, or the mass storage 1108 may constitute the machine readable media 1122. While the machine readable medium 1122 is illustrated as a single medium, the term "machine readable medium" may include a single medium or multiple media (e.g., a centralized or distributed database, and/or associated caches and servers) configured to store the one or more instructions 1124.

The term "machine readable medium" may include any medium that is capable of storing, encoding, or carrying instructions for execution by the machine 1100 and that cause the machine 1100 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1124 may be further transmitted or received over a communications network 1126 using a transmission medium via the network interface device 1120 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1120 may include one or more physical jacks (e.g., Ethernet, coaxial, or phone jacks) or one or more antennas to connect to the communications network 1126. In an example, the network interface device 1120 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1100, and includes digital or analog communications signals or other intangible medium to facilitate communication of such software. A transmission medium is a machine readable medium.

Any of the radio links described herein may operate according to any one or more of the following exemplary radio communication technologies and/or standards including, but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP Rel. 18 (3rd Generation Partnership Project Release 18), 3GPP 5G or 5G-NR, 3GPP LTE Extra, LTE-Advanced Pro, LTE Licensed-Assisted Access (LAA), MulteFire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handyphone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, and the like), technologies operating above 300 GHz and THz bands, (3GPP/LTE based or IEEE 802.11p and other), Vehicle-to-Vehicle (V2V), Vehicle-to-X (V2X), Vehicle-to-Infrastructure (V2I), and Infrastructure-to-Vehicle (I2V) communication technologies, 3GPP cellular V2X, DSRC (Dedicated Short Range Communications) communication systems such as Intelligent-Transport-Systems and others.

Embodiments described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz and further frequencies and Spectrum Access System (SAS) in 3.55-3.7 GHz and further frequencies). Applicable exemplary spectrum bands include IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, to name a few), IMT-advanced spectrum, IMT-2020 spectrum (expected to include 3600-3800 MHz, 3.5 GHz bands, 700 MHz bands, bands within the 24.25-86 GHz range, for example), spectrum made available under the Federal Communications Commission's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz), WiGig Band 3 (61.56-63.72 GHz), and WiGig Band 4 (63.72-65.88 GHz); the 70.2 GHz-71 GHz band; any band between 65.88 GHz and 71 GHz; bands currently allocated to automotive radar applications such as 76-81 GHz; and future bands including 94-300 GHz and above. Furthermore, the scheme can be used on a secondary basis on bands such as the TV White Space bands (typically below 790 MHz) where in particular the 400 MHz and 700 MHz bands can be employed. Besides cellular applications, specific applications for vertical markets may be addressed, such as PMSE (Program Making and Special Events), medical, health, surgery, automotive, low-latency, drones, and the like.

Embodiments described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

Examples

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "embodiment" merely for convenience and without intending to voluntarily limit the scope of this application to any single embodiment or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The following describes various examples of methods, machine-readable media, and systems (e.g., machines, devices, or other apparatus) discussed herein.

Example 1 is a computer-readable hardware storage device that stores instructions for execution by one or more processors of a Base Station (BS) configured to operate within a fifth-generation system (5GS), the instructions to configure the one or more processors to: configure transceiver circuitry to receive signaling from a user equipment (UE), the signaling including a request message comprising a vehicle-to-everything (V2X) capability indication, to indicate UE capability for transmission and reception of V2X messages over a PC5 interface, and Radio Access Technology (RAT) information to indicate a RAT for use in V2X communications over the PC5 reference point; and configure the transceiver circuitry to transmit the request message to a network entity; and decode, from signaling received from the network entity, the signaling including one or more of a V2X services authorization indication to indicate whether the UE is authorized to use V2X communication over the PC5 interface, an indication of the RAT information, and a UE PC5 Aggregate Maximum Bit Rate (UE-PC5-AMBR) indication.

In Example 2, the subject matter of Example 1 includes, wherein the RAT information indicates an Evolved Universal Mobile Telecommunications System Terrestrial Radio Access Network (E-UTRAN) RAT when the UE is to use an E-UTRA RAT for V2X communications over the PC5 reference point, and wherein the RAT information indicates a New Radio (NR) RAT when the UE is to use a NR RAT for V2X communications over the PC5 reference point.

In Example 3, the subject matter of Example 2 includes, wherein the 5GS is a standalone 5G network and the BS is a master Radio Access Network (RAN) node, and wherein the instructions are to configure the one or more processors to configure the RAN node to use a 5G Core Network (5GC).

In Example 4, the subject matter of Examples 2-3 includes, wherein the BS is one of a secondary radio access network (RAN) node or a master RAN node, wherein the instructions are to configure the one or more processors to configure BS to operate within a combined 5GS and fourth-generation system (4GS), wherein when the BS is a secondary RAN node, the instructions are to configure the one or more processors to configure BS to use an Evolved Packet Core (EPC), and wherein when the BS is a master RAN node, the instructions are to configure the one or more processors to configure BS to use a 5G core (5GC).

In Example 5, the subject matter of Examples 3-4 includes, wherein the request message is a registration request message for registration of the UE with the 5GS, and wherein the instructions are to configure the one or more processors to configure the transceiver circuitry to receive the signaling, including the request message, as part of an initial registration procedure.

In Example 6, the subject matter of Examples 3-5 includes, wherein the BS is a source BS and wherein the instructions are to configure the one or more processors to: configure the source BS for a Xn-based handover procedure, wherein as part of the Xn-based handover procedure, the instructions are to configure the one or more processors to: encode a handover request message, for transmission to a target BS, the handover request message including one or more of a V2X services authorized indication to indicate whether the UE is authorized to use V2X communication over the PC5 interface, the indication of the RAT information, and the UE-PC5-AMBR indication.

Example 7 is an apparatus of a user equipment (UE) configured for vehicle-to-everything (V2X) communication in a fifth-generation system (5GS), the apparatus comprising: memory; and processing circuitry configured to: encode a Non-Access Stratum (NAS) request message for transmission to a network entity, the request message including a V2X capability indication, to indicate a capability of the UE for V2X communication over a PC5 reference point, and Radio Access Technology (RAT) information to indicate a RAT for use by the UE in the V2X communications over the PC5 reference point; and configure transceiver circuitry to transmit the request message to the network entity, and wherein the memory is configured to store the V2X capability indication.

In Example 8, the subject matter of Example 7 includes, wherein when the UE is to use an Evolved Universal Mobile Telecommunications System Terrestrial Radio Access Network (E-UTRAN) RAT in V2X communications over the PC5 reference point, the processing circuitry is configured to encode the RAT information of the registration request message to comprise an indication of a E-UTRAN RAT, and wherein when the UE is to use a New Radio (NR) RAT in V2X communications over the PC5 reference point, the processing circuitry is configured to encode the RAT information of the registration request message to comprise an indication of a NR RAT.

In Example 9, the subject matter of Example 8 includes, wherein the request message is a registration request message for registration with the 5GS, wherein the processing circuitry is configured to encode the registration request message as part of a registration procedure, the registration procedure including one of an initial registration, or a registration update, for the UE; and wherein the processing circuitry is configured to decode a registration accept message, received from the network entity, the registration accept message indicating acceptance of the request message.

In Example 10, the subject matter of Examples 8-9 includes, wherein the request message is a service request message to establish a communication link for the UE, and wherein the processing circuitry is configured to encode the service request message as part of a service request procedure.

In Example 11, the subject matter of Examples 8-10 includes, wherein the UE is configured for V2X communication in a combined 5GS and fourth-generation system (4GS), the processing circuitry is configured to encode the request message as an attach request message, as part of an initial attach procedure.

In Example 12, the subject matter of Example 11 includes, wherein the processing circuitry is configured to encode the request message as a tracking area update (TAU) request message, as part of a TAU procedure, to update a tracking area of the UE.

Example 13 is an apparatus of a network entity configured to operate within a fifth-generation system (5GS), the apparatus comprising: memory; and processing circuitry configured to: decode a request message, the request message including vehicle-to-everything (V2X) capability indication, to indicate a capability of a user equipment (UE) for V2X communication over a PC5 interface, and Radio Access Technology (RAT) information to indicate a RAT for use in the V2X communications over the PC5 reference point; and encode signaling for transmission to a base station (BS), the signaling including one or more of a V2X services authorization indication to indicate whether the UE is authorized to use V2X communication over the PC5 interface, an indication of the RAT information, and a UE PC5 Aggregate Maximum Bit Rate (UE-PC5-AMBR) indication, and wherein the memory is configured to store the V2X capability information.

In Example 14, the subject matter of Example 13 includes, wherein the RAT information indicates an Evolved Universal Mobile Telecommunications System Terrestrial Radio Access Network (E-UTRAN) RAT when the UE is to use an E-UTRA RAT for V2X communications over the PC5 reference point, and wherein the RAT information indicates a New Radio (NR) RAT when the UE is to use a NR RAT for V2X communications over the PC5 reference point.

In Example 15, the subject matter of Example 14 includes, wherein the network entity is an Access and Mobility Management Function (AMF), and wherein the processing circuitry is configured to decode signaling received from a Unified Data Management (UDM) entity, the signaling including subscription information associated with the UE; and encode the signaling for transmission to the BS based on a determination, from the subscription information, of whether the UE is authorized to use V2X communication over the PC5 interface.

In Example 16, the subject matter of Examples 14-15 includes, wherein the network entity is further configured to operate within a combined 5GS and fourth-generation system (4GS), and wherein the processing circuitry is configured to decode signaling received from a Home Subscriber Server (HSS), the signaling including subscription information associated with the UE; and encode the signaling for transmission to the BS based on a determination, from the subscription information, of whether the UE is authorized to use V2X communication over the PC5 interface.

In Example 17, the subject matter of Examples 15-16 includes, wherein the processing circuitry is configured to: configure the AMF for a Xn-based handover procedure, wherein as part of the Xn-based handover procedure, the processing circuitry is configured to: encode a N2 Path Switch Request Acknowledge message, for transmission to a target BS, the N2 Path Switch Request Acknowledge message including one or more of the V2X services authorized indication, the indication of the RAT information, and the UE-PC5-AMBR indication.

In Example 18, the subject matter of Examples 15-17 includes, wherein the processing circuitry is configured to: configure the AMF for a N2 based handover procedure, wherein as part of the N2 based handover procedure, the processing circuitry is configured to: encode a N2-AP handover request message, for transmission to a target BS, the N2-AP handover request message including one or more of the V2X services authorized indication, the indication of the RAT information, and the UE-PC5-AMBR indication.

In Example 19, the subject matter of Examples 14-18 includes, wherein the request message is a registration request message for registration with the 5GS, and wherein the processing circuitry is configured to encode a registration accept message, for transmission to the UE, the registration accept message indicating acceptance of the request message.

In Example 20, the subject matter of Examples 15-19 includes, wherein the processing circuitry is configured to: determine a change in the subscription information; and encode, for transmission to a target BS, a N2-AP UE Context Modification Request message to include one or more of an updated V2X services authorized indication, an updated indication of the RAT information, and an updated UE-PC5-AMBR indication.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

What is claimed is:

1. An apparatus of a user equipment (UE) configured for Vehicle-to-Everything (V2X) communication within a fifth-generation system (5GS), the apparatus comprising: processing circuitry; and memory coupled to the processing circuitry, the processing circuitry configured to:
encode a registration request message for transmission to a 5GS network entity as part of a registration procedure, the registration request message encoded to include a PC5 capability for V2X communication, the PC5 capability for V2X communication to indicate whether the UE is capable of supporting V2X communication over a PC5 reference point,
wherein if the PC5 capability for V2X communication indicates that the UE is capable of supporting V2X communication over a PC reference point, the PC5 capability for V2X communication further indicates one or more supported PC5 radio-access technologies (RATs) for V2X communication,
wherein the one or more supported PC5 RATs for V2X communication comprise a long-term evolution (LTE) RAT for V2X communication over an LTE-based PC5 reference point and a new radio (NR) RAT for V2X communication over an NR based PC5 reference point,
receive authorization from a policy control function (PCF) of the 5GS for V2X communication over at least one of the PC5 reference points and for V2X communication over a uU reference point;
in response to the authorization, the processing circuitry is to:
configure the UE for V2X communication with another UE over at least one of the LTE-based PC5 reference point and the NR based PC5 reference point;
configure the UE for V2X communication with a next-generation radio-access network (NG-RAN) of the 5GS over the Uu reference point;
communicate with the other UE over to PC5 reference point; and
receive V2X communications over the uU reference point from the NG-RAN.

2. The apparatus of claim 1, wherein the authorization comprises an aggregate maximum bit rate (AMBR) per PC5 RAT (UE-PC5 AMBR),
wherein communication with the other UE over the PC5 reference point is capped based on the UE-PC5-AMBR, and
wherein the memory is configured to store the UE-PC5-AMBR.

3. The apparatus of claim 1 wherein the processing circuitry is further configured to encode signalling to report the PC5 capability to the 5GC over an N1 reference point.

4. The apparatus of claim 3 wherein the processing circuitry is further configured to decode signalling to receive V2X parameters for V2X communication from the 5GC over the N1 reference point.

5. The apparatus of claim 1 wherein the authorization from the PCF is received in response to transmission of the registration request message indicating the PC5 capability for V2X communication of the UE.

6. The apparatus of claim 1 wherein the processing circuitry is further configured to:
encode a tracking-area update (TAU) request message for transmission, the TAU request message encoded by the processing circuitry to include:
the PC5 capability for V2X communication;
an indication of whether the UE is requesting to use an NR based RAT for V2X communication over a NR-based PC5 reference point or whether the UE is requesting to use an LTE based RAT for V2X communication over an LTE-based PC5 reference point; and
an active flag.

7. The apparatus of claim 6, wherein the processing circuitry is configured to decode an indication of radio and S1 bearers that have been re-established for active bearer contexts in response to the active flag in the TAU request message.

8. The apparatus of claim 1, wherein in response to the authorization, the processing circuitry is to:
configure the UE for V2X communication with another UE over both the LTE-based PC5 reference point and the NR based PC5 reference point.

9. The apparatus of claim 1 wherein the processing circuitry comprises a baseband processor.

10. The apparatus of claim 9 further comprising transceiver circuitry coupled to the processing circuitry, the transceiver circuitry coupled to one or more antennas for millimeter wave communications.

11. A non-transitory computer-readable storage medium comprising instructions to configure processing circuitry of a user equipment (UE) for Vehicle-to-Everything (V2X) communication within a fifth-generation system (5GS), the instructions to configure the processing circuitry to:
encode a registration request message for transmission to a 5GS network entity as part of a registration procedure, the registration request message encoded to include a PC5 capability for V2X communication, the PC5 capability for V2X communication to indicate whether the UE is capable of supporting V2X communication over a PC5 reference point,
wherein if the PC5 capability for V2X communication indicates that the UE is capable of supporting V2X communication over a PC5 reference point, the PC5 capability for V2X communication further indicates one or more supported PC5 radio-access technologies (RATs) for V2X communication,
wherein the one or more supported PC5 RATs for V2X communication comprise a long-term evolution (LTE)

RAT for V2X communication over an LIE-based PC5 reference point and a new radio (NR) RAT for V2X communication over an NR based PC5 reference point, receive authorization from a policy control function (PCF) of the 5GS for V2X communication over at least one of the PC5 reference points and for V2X communication over a uU reference point;

in response to the authorization, the processing circuitry is to:

configure the UE for V2X communication with another UE: over at least one of the LTE-based PC5 reference point and the NR based PC5 reference point;

configure the UE for V2X communication with a next-generation radio-access network (NG-RAN) of the 5GS over the uU reference point;

communicate with the other UE over the PC5 reference point; and receive V2X communications over the uU reference point from the NG-RAN.

12. The non-transitory computer-readable storage medium of claim 11, wherein the authorization comprises an aggregate maximum bit rate (AMBR) per PC5 RAT (UE-PC5 AMBR), wherein communication with the other UE over the PC5 reference point is capped based on the UE-PC5-AMBR, and wherein the memory is configured to store the UE-PC5-AMBR.

13. The non-transitory computer-readable storage medium of claim 11 wherein the processing circuitry is further configured to encode signalling to report the PC5 capability to the 5GC over an N1 reference point.

14. The non-transitory computer-readable storage medium of claim 13 wherein the processing circuitry is further configured to decode signalling to receive V2X parameters for V2X communication from the 5GC over the N1 reference point.

15. The non-transitory computer-readable storage medium of claim 11 wherein the authorization from the PCF is received in response to transmission of the registration request message indicating the PC5 capability for V2X communication of the UE.

16. The non-transitory computer-readable storage medium of claim 11, wherein the processing circuitry is further configured to:

encode a tracking-area update (TAU) request message for transmission, the TAU request message encoded by the processing circuitry to include:

the PC5 capability for V2X communication;

an indication of whether the UE is requesting to use an NR based RAT for V2X communication over a NR-based PC5 reference point or whether the UE is requesting to use an LTE based RAT for V2X communication over an LTE-based PC5 reference point; and an active flag.

17. The non-transitory computer-readable storage medium of claim 16, wherein the processing circuitry is configured to decode an indication of radio and S1 bearers that have been re-established for active bearer contexts in response to the active flag in the TAU request message.

18. The non-transitory computer-readable storage medium of claim 11, wherein in response to the authorization, the processing circuitry is to:

configure the UE for V2X communication with another UE over both the LTE-based PC5 reference point and the NR based PC5 reference point.

19. An apparatus of generation Node B (gNB) configured for operating within a fifth-generation system (5GS), the apparatus comprising:

processing circuitry; and memory coupled to the processing circuitry, the processing circuitry configured to:

decode a registration request message received from a User Equipment for transmission to a 5GS network entity as part of a registration procedure, the registration request message encoded to include a PC5 capability for Vehicle-to-Everything (V2X) communication, the PC5 capability for V2X communication to indicate whether the UE is capable of supporting V2X communication over a PC5 reference point, wherein if the PC5 capability for V2X communication indicates that the UE is capable of supporting V2X communication over a PC5 reference point, the PC5 capability for V2X communication further indicates one or more supported PC5 radio-access technologies (RATs) for V2X communication, wherein the one or more supported PC5 RATs for V2X communication comprise a long-term evolution (LTE) RAT for V2X communication over an LTE-based PC5 reference point and a new radio (NR) RAF for V2X communication over an NR based PC5 reference point, receive authorization from a policy control function (PCF) of the 5GS for V2X communication by the UE over at least one of the PC5 reference points and for V2X communication by the UE over a uU reference point;

in response to the authorization, the processing circuitry is to encode signalling for transmission to the UE, the signalling to:

authorize the UE for V2X communication with another UE over at least one of the LTE-based PC5 reference point and the NR based PC5 reference point;

authorize the UE for V2X communication with a next-generation radio-access network (NG-RAN) of the 5GS over the uU reference point; and encode V2X communications for transmission over the uU reference point to the UE from the NG-RAN, wherein the gNB is part of the NG-RAN.

20. The apparatus of claim 19, wherein the authorization comprises an aggregate maximum bit rate (AMBR) per PC5 RAT (UE-PC5 AMBR), wherein communication with the other UE over the PC5 reference point is capped based on the UE-PC5-AMBR, wherein the processing circuitry is further configured to decode signalling from the UE that indicates the PC5 capability of the UE over an N1 reference point, and wherein the processing circuitry is further configured to decode signalling comprising V2X parameters for V2X communication by the LTE from the 5GC over an N2 reference point.

* * * * *

UNITED STATES PATENT AND TRADEMARK OFFICE
CERTIFICATE OF CORRECTION

PATENT NO. : 10,986,539 B2  
APPLICATION NO. : 16/787360  
DATED : April 20, 2021  
INVENTOR(S) : Shan et al.

Page 1 of 1

It is certified that error appears in the above-identified patent and that said Letters Patent is hereby corrected as shown below:

In the Claims

In Column 37, Line 43, in Claim 1, delete "PC" and insert --PC5-- therefor

In Column 37, Line 64, in Claim 1, delete "to" and insert --the-- therefor

In Column 39, Line 1, in Claim 11, delete "LIE-base" and insert --LTE-based-- therefor In Column 39, Line 11, in Claim 11, delete "UE:" and insert --UE-- therefor In Column 39, Line 15, in Claim 11, delete "uU" and insert --Uu-- therefor In Column 40, Line 10, in Claim 19, after "and", insert a linebreak In Column 40, Line 28, in Claim 19, delete "RAF" and insert --RAT-- therefor In Column 40, Line 43, in Claim 19, delete "uU" and insert --Uu-- therefor In Column 40, Line 58, in Claim 20, delete "LTE" and insert --UE-- therefor Signed and Sealed this  
Twenty-eighth Day of December, 2021

Drew Hirshfeld  
*Performing the Functions and Duties of the*  
*Under Secretary of Commerce for Intellectual Property and*  
*Director of the United States Patent and Trademark Office*